(12) United States Patent
Ettes

(10) Patent No.: US 10,886,782 B2
(45) Date of Patent: Jan. 5, 2021

(54) WIRELESS INDUCTIVE POWER TRANSFER

(71) Applicant: KONINKLIJKE PHILIPS N.V., Eindhoven (NL)

(72) Inventor: Wilhelmus Gerardus Maria Ettes, Leeuwarden (NL)

(73) Assignee: Koninklijke Philips N.V., Eindhoven (NL)

( * ) Notice: Subject to any disclaimer, the term of this patent is extended or adjusted under 35 U.S.C. 154(b) by 180 days.

(21) Appl. No.: 16/082,173

(22) PCT Filed: Feb. 22, 2017

(86) PCT No.: PCT/EP2017/053966
§ 371 (c)(1),
(2) Date: Sep. 4, 2018

(87) PCT Pub. No.: WO2017/153164
PCT Pub. Date: Sep. 14, 2017

(65) Prior Publication Data
US 2019/0097459 A1    Mar. 28, 2019

(30) Foreign Application Priority Data
Mar. 8, 2016 (EP) .................................... 16159079

(51) Int. Cl.
*H02J 50/12* (2016.01)
*H04B 5/00* (2006.01)
*H02J 50/80* (2016.01)

(52) U.S. Cl.
CPC .............. *H02J 50/12* (2016.02); *H02J 50/80* (2016.02); *H04B 5/0031* (2013.01); *H04B 5/0037* (2013.01); *H04B 5/0075* (2013.01)

(58) Field of Classification Search
CPC ........ H02J 50/12; H02J 50/80; H04B 5/0075; H04B 5/0031; H04B 5/0037
See application file for complete search history.

(56) References Cited

U.S. PATENT DOCUMENTS 8,558,412 B2   10/2013   Kim et al.
2002/0077710 A1  6/2002   Harrington et al.
(Continued)

OTHER PUBLICATIONS

Wireless Power Consortium, Accessed Aug. 31, 2018, https://www.wirelesspowerconsortium.com/index.html.
(Continued)

*Primary Examiner* — Daniel J Cavallari

(57) ABSTRACT

A wireless power transfer system comprises a power transmitter (101) arranged to wirelessly power a power receiver (103) via an inductive signal. The power transmitter (101) comprises a variable resonance circuit for generating the inductive signal in response to a drive signal. The resonance circuit has a variable resonance frequency and comprises a transmitter coil (121) arranged to generate the inductive signal. A driver (707) generates the drive signal for the variable resonance circuit and a modulator (711) amplitude modulates the inductive signal by varying the variable resonance frequency in response to data values for transmission to the power receiver (105). The power receiver (105) comprises a demodulator (1105) for demodulating amplitude modulation of the inductive signal and a first power extractor (1113) for extracting power from the inductive signal and for powering at least part of the power receiver. The inductive signal may be provided in addition to a higher power main power transfer signal.

11 Claims, 20 Drawing Sheets

(56) References Cited

U.S. PATENT DOCUMENTS

| | | |
|---|---|---|
| 2011/0081857 A1 | 4/2011 | Lee et al. |
| 2012/0038220 A1 | 2/2012 | Kim et al. |
| 2012/0091794 A1 | 4/2012 | Campanella |
| 2012/0228952 A1 | 9/2012 | Campanella |
| 2012/0293118 A1 | 11/2012 | Kim et al. |
| 2013/0181517 A1 | 7/2013 | Maguire |
| 2014/0162554 A1* | 6/2014 | Sankar ................. H04B 5/0037 455/41.2 |
| 2014/0179223 A1 | 6/2014 | Sessink et al. |

OTHER PUBLICATIONS

Segar, V., "Electronics Design Document—13.56MHz Auxiliary Power and Communication Channel", Feasibility Study, Sep. 2015.

"White paper: Cordless kitchen appliances, a powerful new kitchen concept", Wireless Power Consortium, Apr. 2013.

Segar, V., "Cordless Kitchen: Feasibility Study 13.56 MHz Communication Channel", Aug. 31, 2018.

Aslanidis, K. et al., "External Power Amplifier", Texas Instruments, 2013.

"RF Amplifier for NXP Contactless NFC Reader IC's", NXP Semiconductors—founded by Philips, 2008.

"Identification cards—Contactless integrated circuit(s) cards—Proximity cards—Part 3: Initialization and anticollision", International Standard, ISO/IEC 14443-3, First edition: 2001.

\* cited by examiner

WIRELESS INDUCTIVE POWER TRANSFER

CROSS-REFERENCE TO PRIOR APPLICATIONS

This application is the U.S. National Phase application under 35 U.S.C. § 371 of International Application No. PCT/EP2017/053966, filed on 22 Feb. 2017, which claims the benefit of European Patent Application No. 16159079.9, filed on 8 Mar. 2016. These applications are hereby incorporated by reference herein.

FIELD OF THE INVENTION

The invention relates to inductive power transfer and in particular, but not exclusively, to a power transmitter providing inductive power transfer using elements compatible with the Qi Specifications for wireless power transfer systems.

BACKGROUND OF THE INVENTION

Most present day systems require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply wherein power is inductively transferred from a transmitter inductor in a power transmitter device to a receiver coil in the individual devices. Power transmission via magnetic induction is a well-known concept, mostly applied in transformers having a tight coupling between a primary transmitter inductor and a secondary receiver coil. By separating the primary transmitter inductor and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter inductor in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach known as the Qi Specifications has been defined and is currently being developed further. This approach allows power transmitter devices that meet the Qi Specifications to be used with power receiver devices that also meet the Qi Specifications without these having to be from the same manufacturer or having to be dedicated to each other. The Qi standard further includes some functionality for allowing the operation to be adapted to the specific power receiver device (e.g. dependent on the specific power drain).

The Qi Specification is developed by the Wireless Power Consortium and more information can e.g. be found on their website:
http://www.wirelesspowerconsortium.com/index.html,
where in particular the defined Specification documents can be found.

Many wireless power transmission systems, such as e.g. Qi, supports communication from the power receiver to the power transmitter thereby enabling the power receiver to provide information to the power transmitter that may allow this to adapt to the specific power receiver or the specific conditions experienced by the power receiver.

In many systems, such communication is by load modulation of the power transfer signal. Specifically, the communication is achieved by the power receiver performing load modulation wherein a load applied to the secondary receiver coil by the power receiver is varied to provide a modulation of the power signal. The resulting changes in the electrical characteristics (e.g. variations in the current of the transmitter inductor) can be detected and decoded (demodulated) by the power transmitter.

More information of the application of load modulation in Qi can e.g. be found in chapter 6 of part 1 of the Qi wireless power specification (version 1.0).

In addition to load modulation communication from the power receiver to the power transmitter, it has been proposed to support communication from the power transmitter to the power receiver. Such communication has been proposed to be implemented by modulating the main power signal. However, in many scenarios, such an approach may not provide optimized performance. As an alternative, it has also been proposed to provide a communication channel from the power transmitter to the power receiver using a separate communication link, and specifically using a separate communication coil.

In particular, it has been proposed to generate a communication carrier by driving a second coil which is separate from main power transfer coil. The communication carrier may then be amplitude modulated to represent the data. Further, the communication carrier may be generated to operate in a different frequency band to the main power transfer signal thereby reducing interference between these.

In addition to providing data communication from the power transmitter to the power receiver, the communication carrier may also be used for communication from the power receiver to the power transmitter. This communication may be in addition to communication from the power receiver to the power transmitter using the main power transfer signal. For example, during standby and initialization phases, the power receiver may communicate with the power transmitter using the communication carrier while it during the power transfer mode may be achieved using load modulation of the main power transfer signal. For example, the power receiver may initially transmit power transfer initialization and configuration messages using the communication carrier and may subsequently during the transfer operation transmit power control message by load modulating the main power transfer signal. The communication from the power receiver to the power transmitter using the communication carrier may specifically be achieved by load modulating the communication carrier.

The Wireless Power Consortium (WPC) responsible for the development of the Qi Specifications has established the Kitchen Work Group to develop an interface specification for cordless kitchen appliances. The Kitchen Work Group seeks to develop an approach for wireless power transfer suitable for a kitchen scenario. In such a scenario, an inductive power source can be located in the countertop with a cordless appliance being located on top of the countertop.

This new interface specification is intended to enable cordless operation of kitchen appliances and defines the mechanical and electrical interface between kitchen appliances and inductive power sources. It seeks to enable a new class of cordless appliances which will be easy to handle, easy to clean, and easy to store. The new specification will support direct power transfer to power receivers that can then provide electrical power to a load (referred to as Inductive Power Transfer (IPT)). It further supports the provision of a power transfer signal which directly and inductively heats a suitable heating element by inducing eddy currents in the element (referred to as Induction Heating (IH)).

In order to identify the type of cordless appliance and to control the power transfer, a communication channel is established between the cordless appliance and the inductive power source, i.e. between the power transmitter and the power receiver. This communication channel may for example be used to provide a power control loop e.g. enabling speed control of a motor, temperature control of a heating appliance, pressure measurements of a cooking vessel, over-boiling prevention etc.

In the Kitchen Work Group, it has been proposed to implement the communication functionality using a very short range communication approach very similar to the Near Field Communication (NFC) approach. In particular, the approach has been proposed to operate at the same frequency of 13.56 MHz and to use amplitude modulation for communication from the power transmitter to the power receiver (corresponding to the tag of NFC) and load modulation for communication from the power receiver to the power transmitter.

The approach is based on using a proximity effect where the communication range is restricted to relatively few centimeters. Such a short range may reduce the power requirements for communication and allow a coupled and one-to-one relationship between the communication coil of the power transmitter and the complementary communication coil of the power receiver. It may further provide some additional security in reducing the risk of communicated data not being between the power transmitter and the power receiver (e.g. if other power receivers are nearby).

The approach is based on using separate communication coils for the primary power transfer and for the communication. Thus, a communication carrier is generated by a separate communication coil. The communication carrier may be AM modulated by the power transmitter or load modulated by the power receiver.

The approach of using a separate communication carrier and communication coils is particularly attractive for high power applications. Typically, modulation of high power signals tends to be more difficult than modulation of low power signals. In particular, load modulation tends to be impractical for high power signals and in particular may introduce significant losses. As the Kitchen Work Group is designing a system for high power applications, a separate communication carrier and communication coils have therefore been introduced.

In addition to the communication, the communication carrier may also enable a power transfer to the power receiver. Thus, the communication carrier may be a secondary power transfer signal which specifically may be used to power some circuits (specifically initialization and communication circuitry) during the initialization and configuration phases of the power transfer. This power may often be kept at a relatively low level, say below 1 W whereas the power level of the main power transfer may be much higher.

The provision of power via the communication carrier, and specifically the implementation of a main and secondary power transfer path, may be very advantageous in many scenarios. In particular, it may allow for some circuitry, such as initialization, configuration, communication, and control circuitry to be activated and powered without requiring the main power transfer signal to be active.

For example, the Kitchen Work Group is envisaging that an appliance/power receiver may comprise a standard NFC tag/receiver for interacting with the power transmitter. In such a system, when the presence of an appliance is detected by the power transmitter, the communication front end may generate a communication carrier in order to power up the NFC Tag inside the appliance, with the power transfer being achieved via the communication coils of the power transmitter and appliance. The power transmitter may send an identifier request to the NFC Tag. If detected, the NFC Tag polls interfaces with the remaining parts of the power receiver in order to determine a power request and a control error. Subsequently, the NFC Tag transmits data by load modulating the communication carrier. The power transmitter may then confirm receipt of the power request and control error by generating a main power transfer signal using the main transmit power coil thereby providing the main power to the cordless appliance through the power channel.

Thus, in addition to the communication, the communication carrier can also be used to provide a small amount of auxiliary power to the cordless appliance. This small amount of power is used to power-up the user interface of the cordless appliance, when the cordless appliance itself is not (yet) in use. Thanks to the auxiliary power channel, it is not necessary to use the main power channel to e.g. power-up the user interface of the cordless appliance and the standby losses of the complete system can be reduced substantially.

However, the requirement for the communication carrier to also act as a power transfer signal also introduces some challenges. In particular, it requires an increased power of the drive signal for the communication carrier. A typical requirement for the auxiliary power supply is in the range of 200-1000 mW of received power. Such a high amount of power typically requires circuitry designed for higher power levels than typically used for e.g. NFC systems. Another issue is that AM modulation must be performed on higher power level signals which in many systems result in increased losses and thus reduced efficiency.

In particular, AM modulation may often be achieved by controlling the voltage supply to an output power stage. However, in order to provide higher power levels, this is typically associated with higher losses.

A particular critical problem when using AM modulation is how to control the amplitude variations, and specifically how to accurately control the relative amplitude levels used in the modulation. Setting the variations to be too small results in reduced communication performance (more errors) but setting them too high can affect other performance metrics, such as the efficiency of the power transfer provided by the carrier.

Hence, an improved approach would be advantageous. In particular, an approach that allows improved operation, improved power transfer, increased flexibility, facilitated implementation, facilitated operation, improved communication, reduced complexity, reduced power losses, improved and/or facilitated control of amplitude variations when using AM modulation, and/or improved performance would be advantageous.

SUMMARY OF THE INVENTION

Accordingly, the Invention seeks to preferably mitigate, alleviate or eliminate one or more of the above mentioned disadvantages singly or in any combination. According to an aspect of the invention there is provided a power transmitter for wirelessly providing power to a power receiver via an inductive signal; the power transmitter comprising: a variable resonance circuit for generating the inductive signal in response to a drive signal, the variable resonance circuit comprising an inductive impedance and a capacitive impedance, the resonance circuit having a variable resonance frequency and the inductive impedance comprising a transmitter coil arranged to generate the inductive signal; a driver for generating the drive signal for the variable resonance circuit; and a modulator for amplitude modulating the inductive signal for transmitting data values to the power receiver by varying the variable resonance frequency in response to the data values; wherein the variable resonance circuit comprises a resonance modification circuit for controlling the variable resonance frequency by slowing a state change for at least one of the capacitive impedance and the inductive impedance for a fractional time interval of at least some cycles of the drive signal, and the modulator is arranged to adapt the duration of the fractional time interval in response to the data values.

The invention may provide improved performance in many wireless power transfer systems. It may provide facilitated and/or improved communication in many scenarios and may in particular provide improved operation during transmission of data from the power transmitter to the power receiver using amplitude modulation. In many embodiments, the approach may allow an increased power level while still allowing low complexity and low cost circuitry to be used. For example, it may allow a low power IC (e.g. a standard communication IC) to be used with a non-linear power amplifier while still providing a variety of amplitude modulation approaches to be used, including Non-Return to Zero (NRZ) amplitude modulation.

The variable resonance circuit may be arranged to vary a value of the inductive and/or capacitive impedance in response to a control signal generated by the modulator. The modulator may be arranged to generate the control signal in response to the data values that are to be transmitted to the receiver such that the changes in the resonance frequency result in an amplitude change of the inductive signal (also referred to as the inductive communication signal) as required by the modulation scheme.

The variable resonance circuit may comprise a resonance modification circuit arranged to vary the variable impedance in response to the control signal. The modulator and the resonance modification circuit may be arranged to vary the resonance frequency to match amplitude variations resulting from applying an amplitude modulation scheme to the data values.

The resonance modification circuit may e.g. include a switch switching the variable impedance between different impedances corresponding to different resonance frequencies. Each resonance frequency may correspond to an amplitude level used by the amplitude modulation. The resonance modification circuit may be arranged to switch between the variable resonance frequencies in response to the control signal. The modulator may generate the control signal to be a switch signal switching the variable impedance between the different impedances such that the impedance corresponding to the resonance frequency corresponding to the amplitude level required by the communication protocol for the current data values is selected.

In some embodiments, the modulator is arranged to switch the variable resonance frequency between a set of predetermined resonance frequencies in response to the data values. The set of frequencies may in many embodiments consist of two frequencies.

The approach of the resonance modification circuit may provide a particularly advantageous operation in many embodiments and may in particular provide efficient yet low complexity and easy to implement adaptation of the variance resonance frequency to provide amplitude modulation.

The approach may be highly efficient in controlling the amplitude variations and may specifically in many scenarios provide improved control of the modulation depth. The amplitude modulation may be controlled by a very accurate control of the effective resonance frequency by accurately controlling the duration of the fractional time intervals. Indeed, in many embodiments, the effective resonance frequecies, and thus the amplitude levels of the amplitude modulation, may be controlled by controlling the timing of drive signals for switches initiating and/or terminating the fractional time intervals. Specifically, in many embodiments, the approach may allow the effective resonance frequency to simply align to, and be the same as, the frequency of a drive signal controlling a switch initiating or terminating the fractional time intervals. The approach may in particular enable the amplitude varations, and specifically the modulation depth, to be substantially independent of the exact component values for the resonating components. Thus, tolerances and drift of the resonance circuit components can be automatically compensated for.

This may allow a more accurate and reliable setting of the resonance frequencies, and thus of the amplitude levels. Accordingly, the design does not need to reflect component worst case scenarios and therefore the modulation depth may often be set substantially lower as the safety margin can be reduced substantially. This may provide an improved power transfer in many applications.

The slowing of the state change may be a slowing relative to a resonance circuit including only the capacitive impedance and the inductive impedance. Such a circuit may have a (free running) resonance frequency (referred to as the natural resonance frequency) which is higher than the effective resonance frequency resulting from the state change being slowed.

The slowing of the state change results in a modified (effective) impedance. The capacitive impedance and the inductive impedance may typically be coupled in a series or parallel resonance configuration. The state may specifically be an energy state, and specifically may be a voltage across the capacitive impedance and/or a current through the inductive impedance.

The fractional time interval has a duration which is less than half a time period of the drive signal. The start time and end times may typically be time instants relative to a time instant/event of each cycle (in which a fractional time interval is present). For example, the start time and end time may be considered relative to a zero crossing of the drive signal.

The fractional time interval may specifically be a time interval occurring in a plurality of (but not necessarily all or consecutive) cycles of the drive signal and having a duration of less than a cycle/time period of a cycle of the drive signal.

The capacitive impedance may typically be a capacitor and the inductive impedance may typically be an inductor. However, in some embodiments, the capacitive impedance and/or the inductive impedance may e.g. also include a resistive component.

The resonance frequency may typically be increasingly reduced the longer the duration of the fractional time interval. The resonance modification circuit may reduce a natural resonance frequency of the capacitive impedance and the inductive impedance (corresponding to a frequency at which they would oscillate in a resonance circuit consisting of only the capacitive impedance and the inductive impedance). The effective resonance frequency may in many embodiments be reduced by the modulator increasing the duration of the fractional time interval, e.g. by changing the start time and/or end time for the fractional time interval.

In some embodiments, the power transmitter may be arranged to reduce the resonance frequency by increasing the duration of the fractional time interval.

In some embodiments, the resonance modification circuit is arranged to slow the state change by impeding an energy flow between the inductive impedance and the capacitive impedance during the fractional time interval.

This may provide improved performance in many scenarios, and may in particular provide an effective adjustment of the resonance frequency. The approach may facilitate implementation. The energy flow may be impeded while being from the capacitive impedance to the inductive impedance, from the inductive impedance to the capacitive impedance, or both when it is from the inductive impedance to the capacitive impedance and when it is from the capacitive impedance to the inductive impedance.

Impeding energy flow may include both reducing energy flow and completely preventing any energy flow.

In many embodiments, the resonance modification circuit is arranged to slow the state change by impeding current flow between the inductive resonance and the capacitive impedance during the fractional time interval.

This may provide a particularly effective control and may provide a practical implementation. The current flow may be a positive or negative current flow. Impeding current flow may include both reducing current flow and completely preventing (blocking) any current flow.

In some embodiments, the resonance modification circuit is arranged to slow the state change for the inductive impedance by impeding current flow from the capacitive impedance to the inductive impedance during the fractional time interval.

In accordance with an optional feature of the invention, the resonance modification circuit is arranged to determine one of a start time and an end time of the fractional time interval in response to a signal of the resonance circuit and the modulator is arranged to control the other of the start time and the end time in response to the data values.

This may facilitate control of the resonance frequency by the modulator. In many embodiments, it may allow an automatic determination of at least one of the start and end times allowing the active control by the modulator to only consider one time instant. E.g. if a switch is used to control the slowing of the state change, the approach may in many scenarios allow that only one of the switch-on and switch-off times needs to be accurately controlled.

In accordance with an optional feature of the invention, the power transmitter further comprises: an amplitude measurer for measuring amplitudes of the inductive signal; a modulation depth determiner for determining a modulation depth in response to variations in the measured amplitudes; and the modulator is arranged to vary the variable resonance frequency in response to the modulation depth.

This may provide improved communicaiton in many embodiments. In particular, it may allow improved trade-off between the communication performance and the power transfer performance. Specifically, it may in many embodiments ensure that the modulation is sufficiently large to be reliably detected while simultaneously maximising (or at least increasing) the average or minimum power being transferred by the inductive communication signal.

In accordance with an optional feature of the invention, the modulator is arranged to switch the variable resonance frequency between a set of resonance frequencies in response to the data values, and to determine at least one frequency of the set of resonance frequencies in response to the modulation depth.

This may allow improved performance and/or facilitated operation.

In accordance with an optional feature of the invention, the power transmitter further comprises a demodulator for demodulating load modulation of the inductive signal.

The approach for amplitude modulation for transmissions to the power receiver using a variable resonance circuit allows efficient load modulation to be used for transmissions from the power receiver thereby providing a highly efficient bidirectional communication approach.

In accordance with an optional feature of the invention, the power transmitter further comprises: a power transfer transmitter coil for generating an inductive power transfer signal for providing power to the power receiver, a maximum power of the inductive power transfer signal being higher than a maximum power of the inductive signal; and a power transfer controller for initializing a power transfer to the power receiver via the inductive power transfer signal; wherein the power transfer controller is arranged to generate at least some of the data values as power transfer initialization control data.

The approach may allow very high power level wireless power transfer while achieving a low standby power usage and still allowing low complexity and low cost communication circuitry to be used. A particularly efficient interworking between different power provision paths can be achieved.

The power transfer initialization control data may be data that is communicated as part of a power transfer initialization process, and in particular may be data that is communicated before the inductive power transfer signal has been generated (switched on) but as part of the process of setting up/starting the power transfer using the inductive power transfer signal.

In accordance with an optional feature of the invention, the driver is arranged to generate the drive signal to have a drive frequency which is independent of the data values. The amplitude modulation may be achieved by varying the variable resonance frequency while keeping the drive frequency substantially unchanged for at least two consecutive data symbols. Specifically, the change of the drive frequency may be so slow that any amplitude variation resulting from the change of the drive frequency between two consecutive data symbols for a constant variable resonance frequency is less than 10% of the smallest difference in amplitude between amplitude levels used for the amplitude modulation.

In many practical systems, the drive frequency is substantially constant over two data symbol times.

In accordance with an optional feature of the invention, the driver is arranged to generate the drive signal with at least one of a voltage amplitude and a current amplitude of the drive signal being independent of the data values.

The amplitude modulation may be achieved by varying the variable resonance frequency while keeping the amplitude of the voltage and/or current of the drive frequency substantially unchanged for at least two consecutive data symbols. Specifically, the change of the amplitude may be so slow that any such amplitude variation for two consecutive data symbols is less than 10% of the smallest difference in amplitude between the amplitude levels used for the amplitude modulation.

In many practical systems, the voltage and/or current may have a substantially constant value over two data symbol times.

In accordance with an optional feature of the invention, a frequency of the drive signal is not below 10 MHz.

This may be particularly suitable for amplitude modulation by varying a variable resonance frequency. It may further in many embodiments provide a suitable frequency range for transfer of lower power levels whereas higher power levels can more effectively be transferred at lower frequencies In accordance with another aspect of the invention, there is provided a wireless power transfer system comprising a power transmitter and a power receiver, the power transmitter being arrange to wirelessly provide power to the power receiver via an inductive signal; the power transmitter comprising: a variable resonance circuit for generating the inductive signal in response to a drive signal, the variable resonance circuit comprising an inductive impedance and a capacitive impedance, the resonance circuit having a variable resonance frequency and the inductive impedance comprising a transmitter coil arranged to generate the inductive signal; a driver for generating the drive signal for the variable resonance circuit; a modulator for amplitude modulating the inductive signal for transmitting data values to the power receiver by varying the variable resonance frequency in response to the data values; and the power receiver comprising: a receiver coil for receiving the inductive signal; a demodulator for demodulating amplitude modulation of the inductive signal; and a first power extractor for extracting power from the inductive signal and for powering at least part of the power receiver; wherein the variable resonance circuit comprises a resonance modification circuit for controlling the variable resonance frequency by slowing a state change for at least one of the capacitive impedance and the inductive impedance for a fractional time interval of at least some cycles of the drive signal, and the modulator is arranged to adapt the duration of the fractional time interval in response to the data values.

The approach may provide a very efficient combinated power transfer and communication approach In accordance with an optional feature of the invention, the power transmitter further comprises: a power transfer transmitter coil for generating an inductive power transfer signal for providing power to the power receiver, a maximum power of the inductive power transfer signal being higher than a maximum power of the inductive signal; and a power transfer controller for initializing a power transfer to the power receiver via the inductive power transfer signal; wherein the power transfer controller is arranged to generate at least some of the data values as power transfer initialization control data; and the power receiver comprises: a power transfer receiver coil for receiving the inductive power transfer signal; a second power extractor for extracting power from the inductive power transfer signal and for powering a load.

The approach may provide a very efficient approach for differentiated power transfer.

In accordance with an optional feature of the invention, the first power extractor is arranged to power the at least part of the power receiver when the inductive power transfer signal is not present and the second power extractor is arranged to power the at least part of the power receiver when the inductive power transfer signal is present.

The approach may allow efficient power transfer, and may in particular in many embodiments allow high power level power transfer while enabling a low power standby mode which nevertheless can effectively initiate the high power level power transfer.

In accordance with another aspect of the invention, there is provided a method of operation for a power transmitter wirelessly providing power to a power receiver via an inductive signal, the power transmitter comprising an variable resonance circuit comprising an inductive impedance and a capacitive impedance, the resonance circuit having a variable resonance frequency and the inductive impedance comprising a transmitter coil; the method comprising: the variable resonance circuit generating the inductive signal in response to a drive signal; generating the drive signal for the variable resonance circuit; amplitude modulating the inductive signal for transmitting data values to the power receiver by varying the variable resonance frequency in response to the data; wherein the variable resonance circuit comprises a resonance modification circuit controlling the variable resonance frequency by slowing a state change for at least one of the capacitive impedance and the inductive impedance for a fractional time interval of at least some cycles of the drive signal, and the amplitude modulating comprises adapting the duration of the fractional time interval in response to the data values.

In accordance with another aspect of the invention, there is provided a method of operation for a wireless power transfer system comprising a power transmitter and a power receiver, the power transmitter being arranged to wirelessly provide power to the power receiver via an inductive signal and comprising an variable resonance circuit comprising an inductive impedance and a capacitive impedance, the resonance circuit having a variable resonance frequency and the inductive impedance comprising a transmitter coil; the method comprising the power transmitter performing the steps of: the variable resonance circuit generating the inductive signal in response to a drive signal; generating the drive signal for the variable resonance circuit; amplitude modulating the inductive signal for transmitting data values to the power receiver by varying the variable resonance frequency in response to the data values; and the power receiver performing the steps of: demodulating amplitude modulation of the inductive signal; and extracting power from the inductive signal and for powering at least part of the power receiver; wherein the variable resonance circuit comprises a resonance modification circuit controlling the variable resonance frequency by slowing a state change for at least one of the capacitive impedance and the inductive impedance for a fractional time interval of at least some cycles of the drive signal, and the amplitude modulating comprises adapting the duration of the fractional time interval in response to the data values.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a wireless power transfer system utilizing a power transfer approach such as that currently envisaged for kitchen applications by the Kitchen Work Group of the Wireless Power Consortium (WPC). However, it will be appreciated that the invention is not limited to this application but may be applied to many other wireless power transfer systems.

Figure 1:
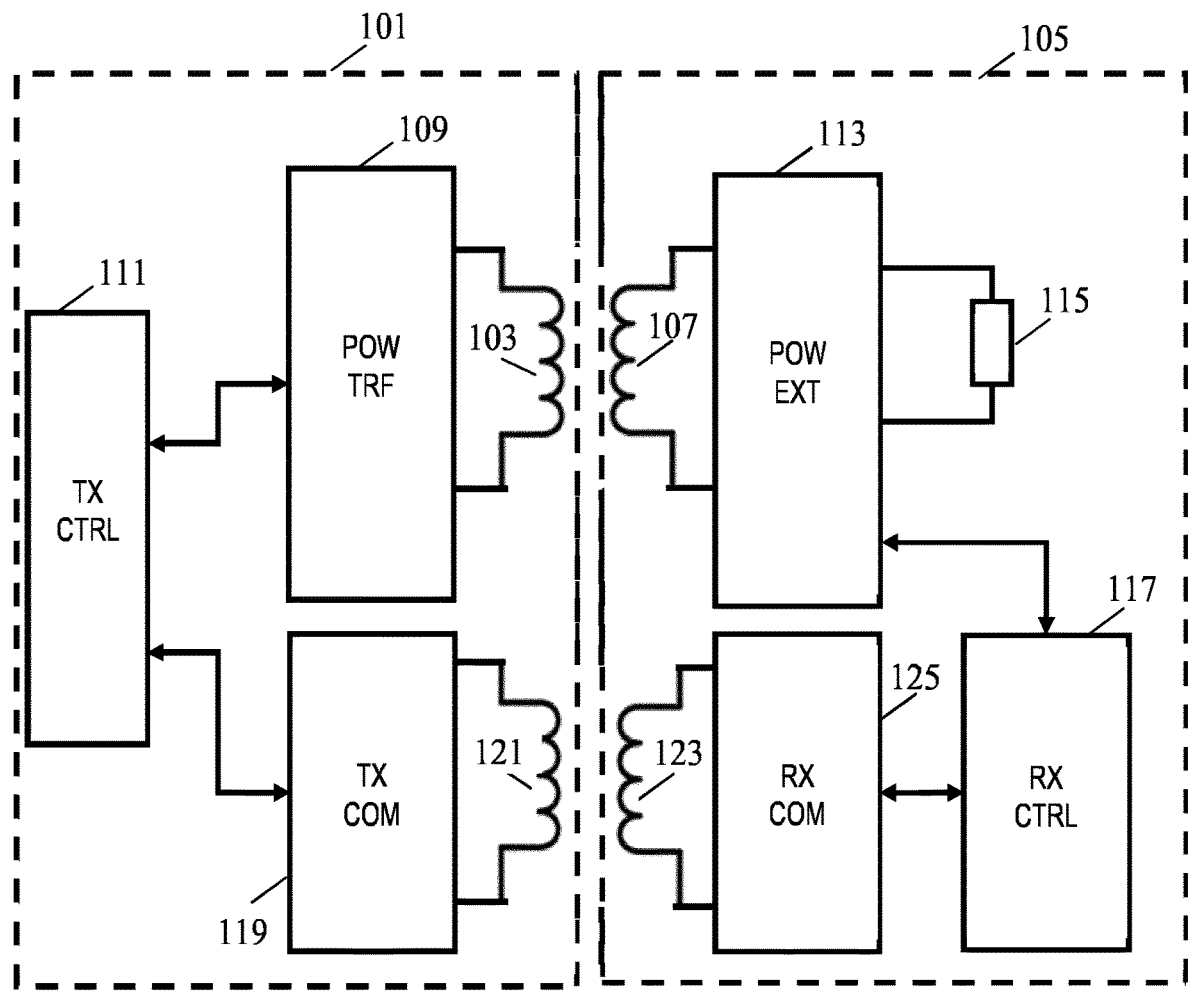
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter inductor/coil, henceforth referred to as a power transfer transmitter coil 103. The system further comprises a power receiver 105 which includes (or is coupled to) a receiver coil/inductor, henceforth referred to as a power transfer receiver coil 107.

The system provides a wireless inductive power transfer from the power transmitter 101 to the receiver 105. Specifically, the power transmitter 101 generates a wireless inductive power transfer signal (also referred to as a power transfer signal, power signal or an inductive power transfer signal), which is propagated as a magnetic flux by the power transfer transmitter inductor 103. The power transfer signal may typically have a frequency between around 20 kHz to around 500 kHz, and for Qi type of systems typically in the range from 100 kHz to 200 kHz. The power transfer transmitter inductor 103 and the power transfer receiver coil 107 are loosely coupled and thus the power transfer receiver coil 107 picks up (at least part of) the power transfer signal from the power transmitter 101. Thus, the power is transferred from the power transmitter 101 to the power receiver 105 via a wireless inductive coupling from the power transfer transmitter inductor 103 to the power transfer receiver coil 107. The term power transfer signal is mainly used to refer to the inductive signal/magnetic field between the power transfer transmitter inductor 103 and the power transfer receiver coil 107 (the magnetic flux signal), but it will be appreciated that by equivalence it may also be considered and used as a reference to an electrical signal provided to the power transfer transmitter inductor 103 or picked up by the power transfer receiver coil 107.

The system is arranged to transfer substantial power levels, and specifically the power transmitter may support power levels in excess of 5 W, 50 W, or even 500 W in many embodiments.

The power transmitter 101 comprises a power transfer circuit 109 which is arranged to drive the power transfer transmitter coil 103 such that it generates the power transfer signal. The power transfer circuit 109 includes suitable functionality for generating a suitable drive signal, for power adjustment, frequency control etc. as will be known to the skilled persons.

In addition, the power transmitter 101 comprises a power transmitter controller 111 which is arranged to control the operation of the power transmitter 101. For example, the power transmitter controller 111 may comprise the required control functionality for establishing, supporting, and terminating a power transfer operation. For example, the power transmitter controller 111 may be arranged to control the power transmitter 101 to operate in accordance with the approach of Qi type power transfer systems.

Complementary, the power receiver 105 comprises a power extractor circuit 113 which is arranged to extract power from the power transfer signal. Thus, specifically, the power transfer receiver coil 107 receives the inductive power transfer signal (by the flux of the inductive power transfer signal inducing a current in the power transfer receiver coil 107) and the power extractor circuit 113 is connected to the power transfer receiver coil 107. The power extractor circuit 113 is coupled to an external load 115 which is powered by the power extracted from the power transfer signal by the power extractor circuit 113.

The power receiver 105 further comprises a power receiver controller 117 which is arranged to control the operation of the power receiver 105. For example, the power receiver controller 117 may implement operation and procedures corresponding to that known from Qi type power transfer systems.

Thus, the power transmitter 101 and the power receiver 105 form a wireless power transfer system wherein power can be transferred from the power transmitter 101 to the power receiver 105. In systems such as those considered by the Kitchen Work Group of the WPC, the power level of the power transfer may be very high, and indeed power levels up to a few Kilo Watts are envisaged.

In the example of FIG. 1, the power receiver 105 comprises a dedicated power transfer receiver coil 107 which is electrically coupled to a power extractor circuit 113 that extracts power which is then provided to an external load 115. However, it will be appreciated that in other embodiments, the power transfer receiver coil 107 may itself be the load, and indeed that the power transfer receiver coil 107 may inherently extract power. For example, the power transfer receiver coil 107 may be a heating element or plate in which eddy currents are induced resulting in a power being lost in the heating element resulting in this being heated by the inductive power transfer signal.

In order to provide an efficient power transfer operation, information exchange is required between the power transmitter 101 and the power receiver 105 and therefore the system of FIG. 1 implements a two-way communication channel between the two entities. In the system of FIG. 1, the communication is established separately from the main power transfer, i.e. the communication does not use the inductive power transfer signal. Rather, in the system of FIG. 1, a separate communication carrier is generated and used for communication both from the power transmitter 101 to the power receiver 105 and from the power receiver 105 to the power transmitter 101.

Specifically, the power transmitter 101 comprises a power transmitter communication circuit 119 which drives a transmitter coil, which will henceforth be referred to as the transmitter communication coil 121. The power transmitter communication circuit 119 thus generates an inductive signal by generating a drive signal for the transmitter communication coil 121. This inductive signal will henceforth be referred to as the inductive communication signal or carrier although it will be appreciated that (as will be described later) the inductive communication signal may also provide some power to the power receiver 105.

Complementary, the power receiver 105 comprises a receiver coil which will henceforth be referred is as the receiver communication coil 123. The receiver communication coil 123 is coupled to a power receiver communication circuit 125 which is arranged to support the communication with the power transmitter 101. The power receiver communication circuit 125 is coupled to the power receiver controller 117.

Thus, in the system of FIG. 1, a second inductive path is implemented to support communication between the power transmitter 101 and the power receiver 105. The communication is achieved using a separate inductive communication signal which is specifically generated to have a much higher frequency than the power transfer signal. Indeed, in many embodiments, the inductive communication signal has a frequency of no less than 10 MHz whereas the power transfer signal has a frequency not above 500 kHz, and typically not above 200 kHz. This may reduce interference between the signals and may allow the different systems to work efficiently despite being in very close proximity (and indeed potentially using overlapping or concentric coils).

The range of the communication channel is furthermore low and in most embodiments does not exceed 10-15 cm. The short range provides additional safety and security and may for example reduce the risk of the power transmitter 101 being controlled by other power receivers in the vicinity.

The communication from the power transmitter 101 to the power receiver 105 will in the following for brevity be referred to as forward communication and the communication channel from the power transmitter 101 to the power receiver 105 will be referred to as the forward communication channel. Correspondingly, communication from the power receiver 105 to the power transmitter 101 will in the following for brevity be referred to as reverse communication and the communication channel from the power receiver 105 to the power transmitter 101 will be referred to as the reverse communication channel.

In the system of FIG. 1, the forward communication channel (i.e. the power transmitter to power receiver communication channel) is implemented by AM modulating the inductive communication signal whereas the reverse communication channel is implemented by the power receiver 105 load modulating the inductive communication signal. Thus, the inductive communication signal forms a communication carrier which may be used for both forward and reverse communication.

In addition to supporting the communication, the inductive communication signal also provides for an auxiliary or secondary power transfer to the power receiver 105. Thus, the inductive communication signal is also used as a secondary power transfer signal. However, the power level that can be provided by the inductive communication signal is in most embodiments substantially lower than the power that can be provided by the inductive power transfer signal. Indeed, in most embodiments, the maximum power that can be provided by the inductive communication signal is no less than five or ten times lower than the maximum power of the power transfer signal, and indeed in many embodiments the difference is even larger.

The inductive communication may specifically be used to power part of the power receiver 105, at least during some time intervals. Specifically, the power provided by the inductive communication signal may be used to power the power receiver communication circuit 125 and/or the power receiver controller 117 during times when there is no inductive power transfer signal being generated.

For example, the power transmitter 101 may be in a standby phase with no power receiver being present. At some point in time, a user may position the power receiver 105 at a suitable position for power transfer from the power transmitter 101. This may be detected by the power transmitter 101 which may accordingly initiate a process that may lead to a power transfer being started.

This may first result in the power transmitter controller 111 controlling the power transmitter communication circuit 119 to generate the inductive communication signal with a suitable power level. Power may be extracted by the power receiver 105 and used to power up the power receiver communication circuit 125 and at least part of the power receiver controller 117. An initialization process may then be started, e.g. in accordance with the approach of the Qi specification or the proposals of the Kitchen Work Group. This process involves communication between the power transmitter 101 and power receiver 105. Upon the successful completion of the power transfer initialization phase, the power transmitter 101 may generate the inductive power transfer signal at a suitable power level (e.g. determined or negotiated during the initialization phase). At this stage, the power receiver 105 may extract power from the power transfer signal to supply to the external load 113. In addition, it may extract power in order to power internal circuitry. This circuitry may include circuitry not previously powered by the inductive communication signal (e.g. circuitry not active during the initialization phase) and may also include some or all of the circuitry previously powered by the inductive communication signal. Thus, for some circuitry, the power receiver 105 may supply power extracted from the power transfer signal when this is present, and otherwise may supply power extracted from the inductive communication signal when this is present.

In the system, the inductive communication signal thus supports communication and also provides a relatively small amount of auxiliary power to the power receiver. This small amount of power may specifically in many cordless appliance applications be used to power-up the user interface of the cordless appliance, when the cordless appliance itself is not (yet) in use. Thanks to the auxiliary power, it is not necessary to use the main power transfer signal to power-up e.g. the user interface of the cordless appliance. The approach may thus allow the standby losses of the complete system to be reduced.

Thus, in the system, two power provision paths co-exist and interwork to effectively provide suitable power to the power receiver 105 at different times and with different properties. Further, one of these power provision paths also provides a bi-directional communication path.

In systems envisaged by the Kitchen Work Group, the communication circuits are envisaged to closely correspond to the Near Field Communication (NFC) approach. In particular, the same frequency and modulation approaches are intended. Further, many of the same functions and procedures for establishing, supporting, and terminating a communication are planned.

The system of FIG. 1 may similarly consider an approach corresponding to the intended approach for the Kitchen Work Group and may use communication circuitry corresponding to the NFC approach (apart from the herein described differences and alternative approaches).

The use of communication functionality closely aligning with the NFC approach may provide a number of advantages. Specifically, it may allow substantial NFC circuits and functionality to be reused for the wireless power transfer approach. For example, NFC communication integrated circuits (ICs) and output circuits have been developed, and it would be cost effective to allow such functionality to be used in the power transmitter 101 and power receiver 105.

Figure 2:
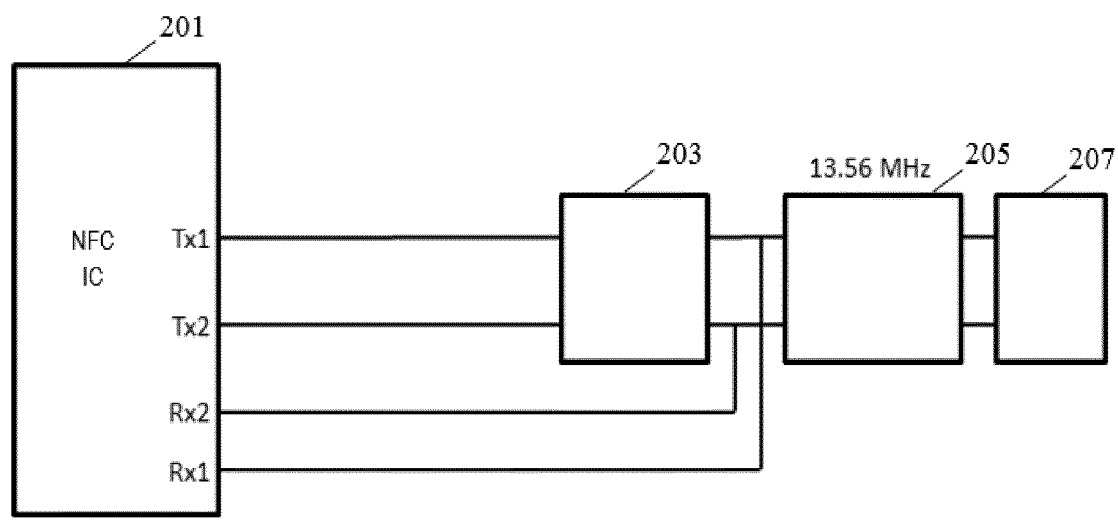
FIGS. 2-4 illustrate examples of elements of a communication circuit for a power transmitter.

FIG. 2 illustrates an example of an NFC communication circuit using a dedicated NFC front end IC 201. The front end IC 201 can generate an AM modulated output on output pins Tx1, Tx2 and can demodulate load modulation based on inputs Rx1, Rx2. Thus, the Tx1/Tx2 output of the front end IC 201 drives the output of the circuit which comprises of a receive/transmit filter 203, a tuning network 205, and a transmit antenna/coil 207 to generate an AM modulated communication carrier.

The signal between the receive/transmit filter 203 and the tuning network 205 is fed to the Rx1/Rx2 input of the front end IC 201 which is arranged to receive/demodulate AM messages transmitted by load modulation by a corresponding NFC Tag.

The purpose of the receive/transmit filter 203 is to shape the waveform of the output of the front end IC 201 and to suppress the received load modulation. The tuning network 205 provides a matching network between the receive/transmit filter 203 and the antenna 207 and further provides a tuned bandpass filter at the operating frequency of 13.56 MHz.

However, whereas the circuit of FIG. 2 is suitable for many NFC applications it may not be optimal for a power transfer circuit such as that of FIG. 1. In particular, typically such circuits cannot provide sufficient auxiliary power to the power receiver.

In many embodiments, a typical requirement for the auxiliary power supply may be in the range of 200-1000 mW of received power. This tends to allow an appropriate part of the power receiver (for example the communication circuit, user interface, and necessary control circuitry) to be powered without the power transfer signal being active. However, typically a circuit such as that of FIG. 2 cannot provide sufficient power. A typical existing RFID/NFC front end IC can only provide a maximum power of around 200 mW to the antenna.

Figure 3:
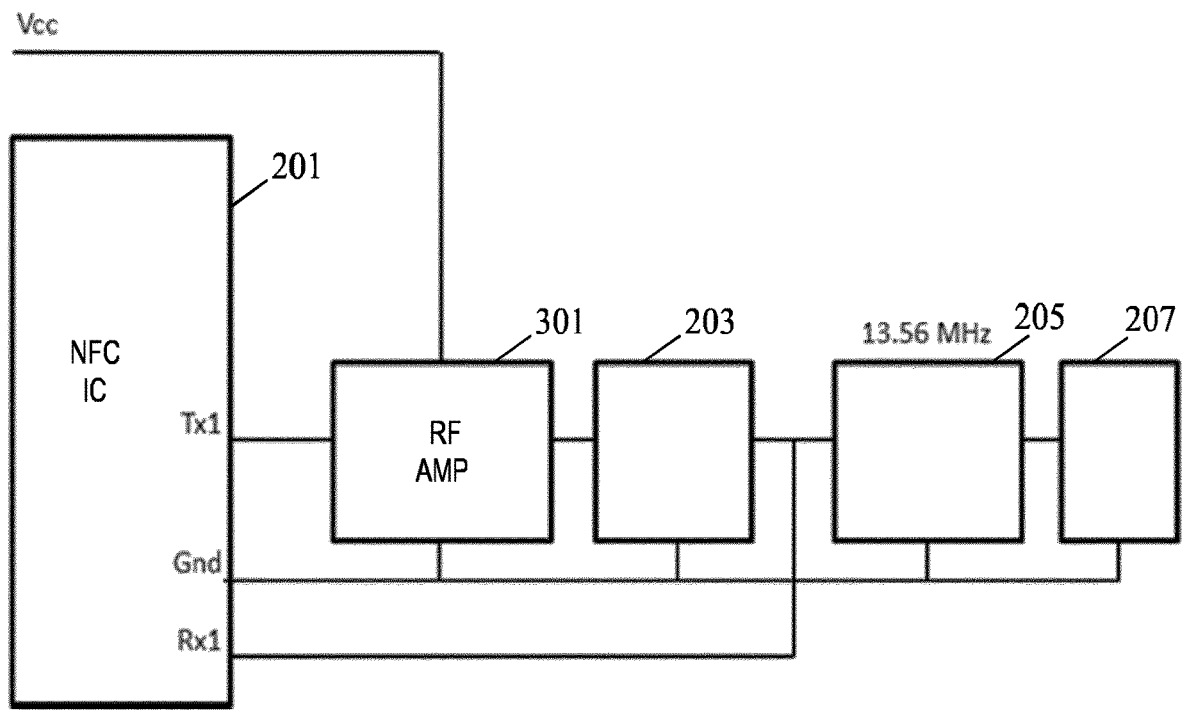

In order to increase the power to levels that are more appropriate for powering parts of an appliance, an external RF amplifier 301 may be added as illustrated in FIG. 3. Such a power amplifier may increase the available power but may also introduce some undesired effects. In particular, in order to reduce distortion of the AM modulation, it is necessary for the RF amplifier 301 to be a fully linear amplifier. However, this increases complexity substantially and reduces the efficiency. Furthermore, due to component tolerances and variations, it is in practice difficult to implement a fully linear amplifier and some modulation distortion is therefore likely to result.

Therefore, in practice the approach of FIG. 3 tends to only allow AM modulation where the carrier is switched completely on or off (corresponding to ISO/IEC 14443-2, Type A modulation). However, if a NRZ (Non Return to Zero) AM modulation is desired (such as ISO/IEC 14443-2, Type B modulation), the non-linear aspects of the amplification by the RF amplifier 301 will introduce distortion.

Figure 4:
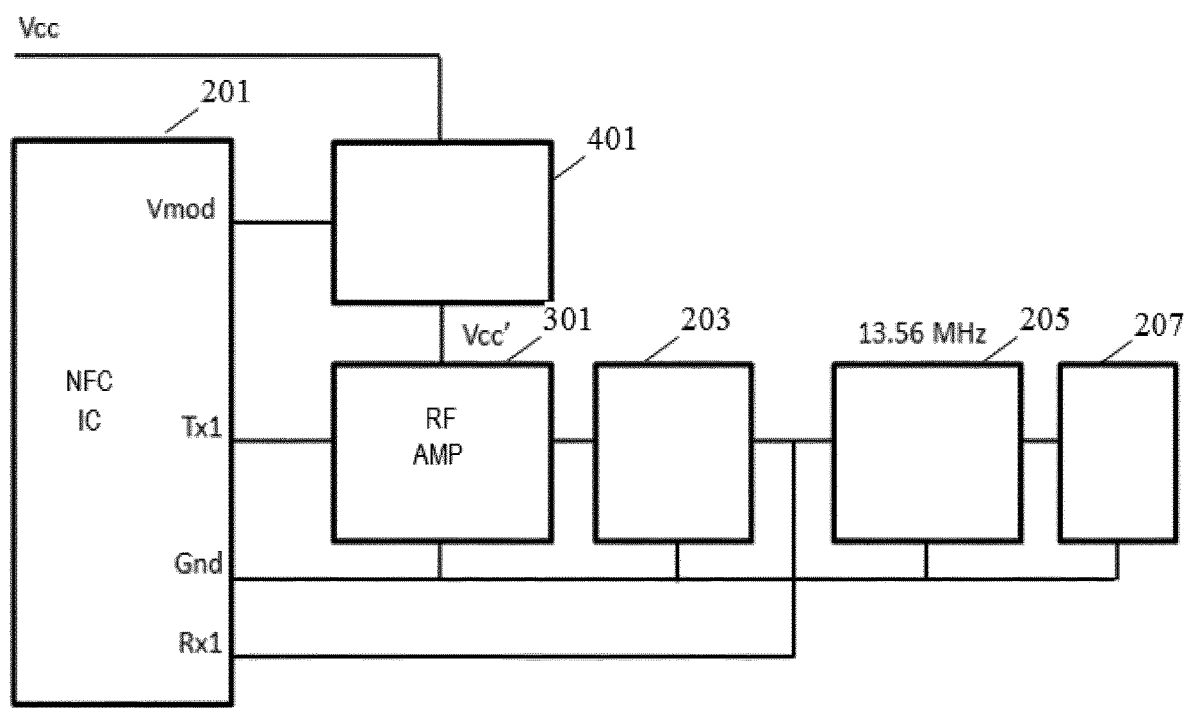

A modified approach may include an external modulator 401 as illustrated in FIG. 4 (ref. e.g. Technical Note TRF7970A: External Power Amplifier, Texas Instruments, 2013). Such an approach may allow Type B modulation without requiring the amplifier to be fully linear.

In the example, the front end IC 201 drives the RF amplifier 301 with single ended output Tx1 and with a supply voltage Vcc' that is varied by the external modulator 401 to vary the amplitude of the output signal. The external modulator 401 adjusts the supply voltage Vcc' to the RF amplifier 301 in response to the modulation output Vmod from the front end IC 201. The amplitude of the generated carrier is a (typically linear) function of the supply voltage Vcc' which is determined by $$Vcc'=f(Vcc, Vmod).$$

where the function f( ) is a suitable function to provide the desired amplitude modulation.

In the approach the supply voltage Vcc is thus reduced to a suitable voltage Vcc' which may vary. This reduction may for example be achieved by controlling the voltage drop over a transistor. However, whereas such an approach is simple and straight forward, the voltage drop required may be substantial and the associated power loss in the transistor (effectively the product of the voltage drop and the supply current to the RF amplifier 301) may be significant. This may result in a substantially increased power consumption and reduced efficiency. Thus, the approach may result in additional extra power losses which increase the standby losses of the complete system.

Although it may be possible to reduce the power loss resulting from the voltage reduction in the external modulator 401, the required circuitry (e.g. high frequency switching and transformers for a switched mode voltage reduction) is relatively complex and will tend to unacceptably increase complexity and cost of the power transmitter.

In the system of FIG. 1, such issues may e.g. be mitigated, reduced, or eliminated by the system introducing AM modulation by varying a resonance frequency of the output resonance circuit of the power transmitter communication circuit 119. For example, and approach corresponding to that of FIG. 5 may be used. For example, the power transmitter communication circuit 119 may include an output circuit such as that illustrated in FIG. 5. The output circuit may correspond to the circuit of FIG. 3 but with an additional modulator 501 which is arranged to change the resonance frequency of an output resonance circuit (indicted by the tuning network 205 and antenna 207 of FIG. 5) in response to the AM modulation.

Figure 5:
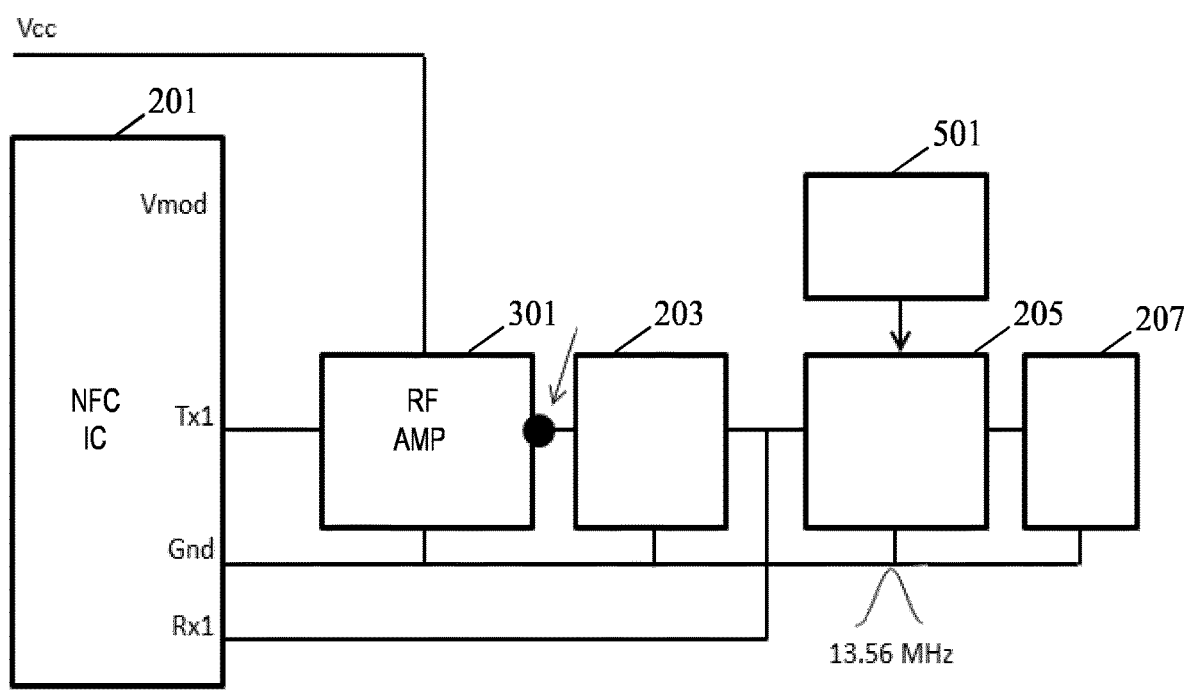
FIG. 5 illustrates an example of elements of a communication circuit for a power transmitter in accordance with some embodiments of the invention.

The change of the resonance frequency will change how close the drive frequency is to the resonance frequency and thus the amplitude for the inductive communication signal. Specifically, if the amplitude and frequency of the drive signal is kept constant while the resonance frequency is changed, the amplitude of the generated inductive communication signal changes. In the approach of FIG. 5, this is used to AM modulate the generated inductive communication signal.

For example, the modulator 501 may be arranged to switch the resonance frequency of the tuning circuit 501 between two resonance frequencies, such as for example between a resonance frequency of 13.56 MHz and a resonance frequency of, say, 15 MHz. The change in resonance frequency may for example be achieved by switching between two capacitors of the resonance frequency (or e.g. connecting/disconnecting one of two parallel capacitors or selectively short circuiting one capacitor of a series coupling of two capacitors).

The tuning circuit 501 is driven by a drive frequency of 13.56 MHz and accordingly the inductive communication signal will be at a higher amplitude for the first resonance frequency than for the second resonance frequency. This may be illustrated by FIG. 6 which illustrates the signal Vmod controlling the switching of the modulator 501, and the current through respectively the antenna 207 of the power transmitter (the transmitter communication coil 121) and the receiver communication coil 123 of the power receiver 105.

Figure 6:
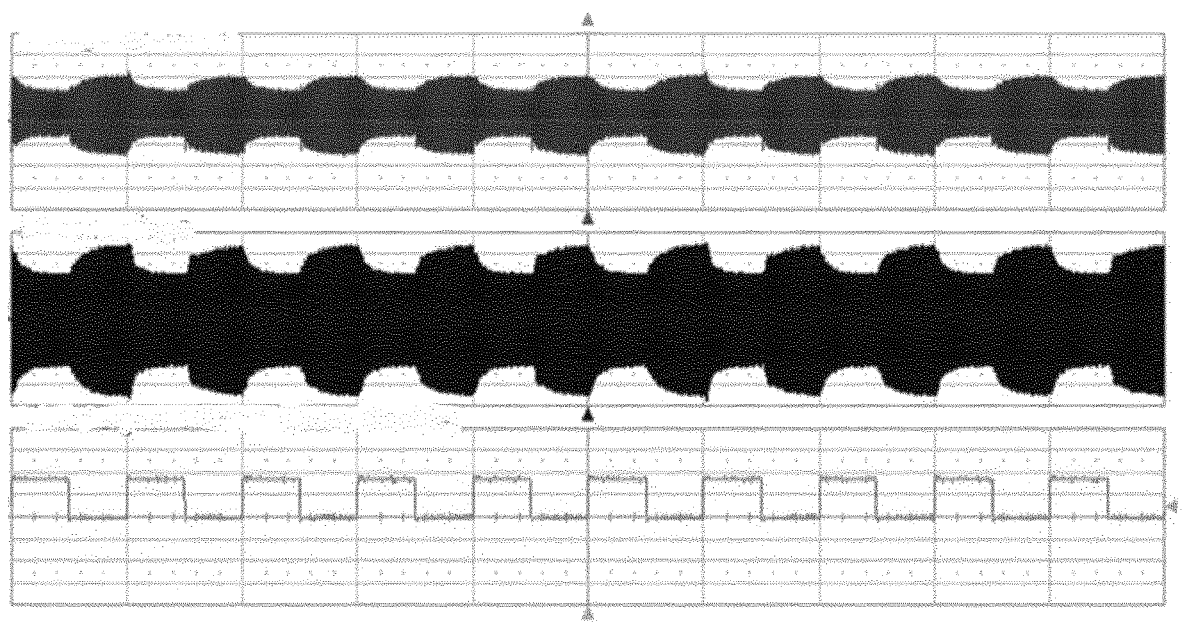
FIG. 6 illustrates examples of signals of a power transmitter in accordance with some embodiments of the invention.

As can be seen in FIG. 6 a very effective AM modulation may be achieved by changing the resonance frequency of the variable resonance circuit at the output of the power transmitter communication circuit 119. Furthermore, AM modulation can be achieved at a high power level using a low complexity (and potentially non-linear) RF amplifier driven by a standard NFC front end IC and supplied with a constant supply voltage.

Figure 7:
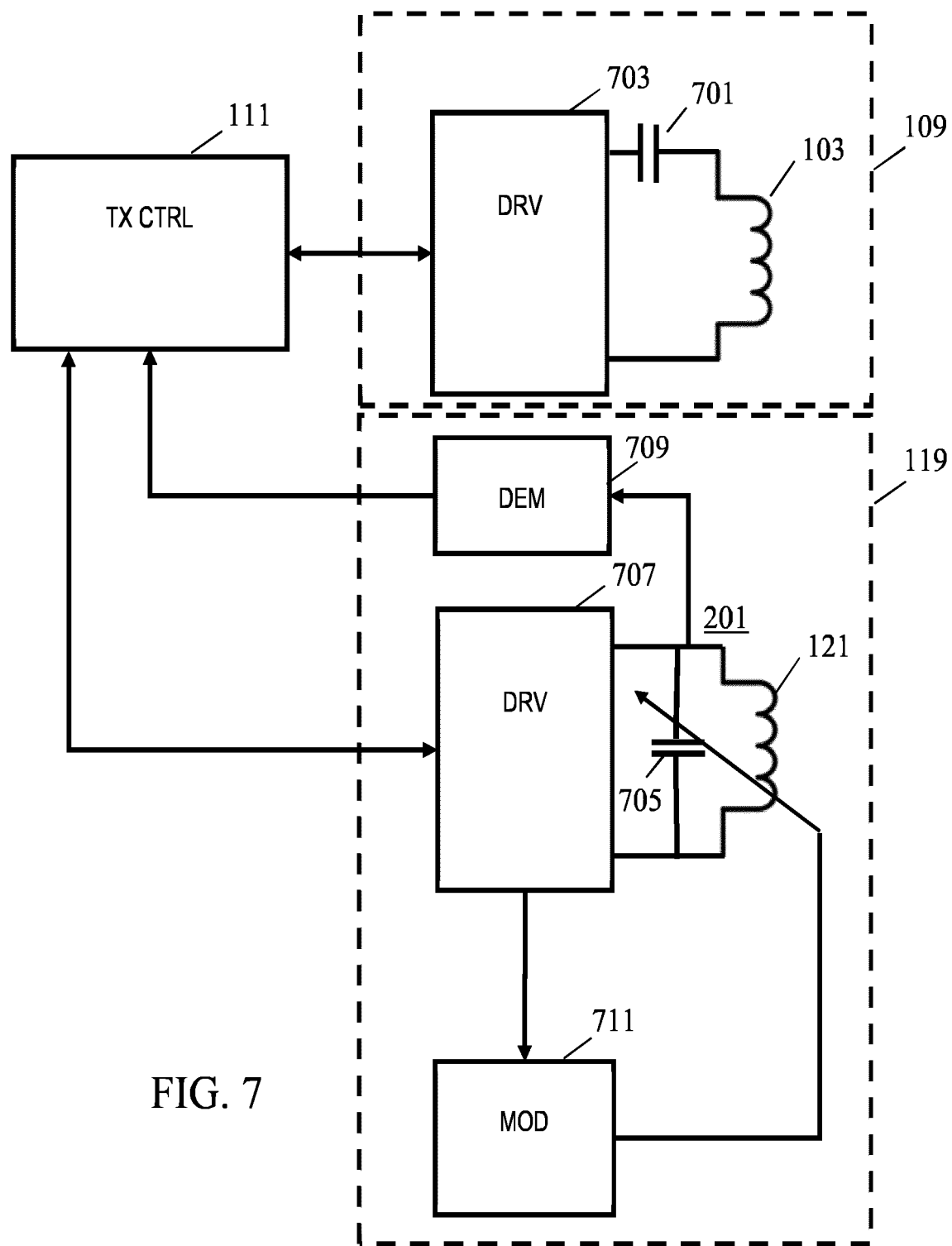
FIG. 7 illustrates an example of elements of a power transmitter in accordance with some embodiments of the invention.

FIG. 7 illustrates an example of an embodiment of the power transmitter 101 of FIG. 1.

In the example, the power transfer circuit 109 comprises a power transfer resonance circuit formed by the transmitter coil 103 and a series capacitor 701. The power transfer resonance circuit is driven by a driver 703 which generates a suitable drive signal for generating the power transfer signal.

Thus, the power transfer output circuit of the power transmitter 101 includes a resonance tank or resonance circuit which is formed by an inductive impedance and a capacitive impedance. The resonance circuit will be referred to as the power transfer resonance circuit. In the example of FIG. 2, the inductive impedance is formed by a single inductor, namely the transmitter coil 103, and the capacitive impedance is formed by a single transmitter capacitor 701.

The power transfer resonance circuit may typically be a serial or parallel resonance circuit, and may in particular as illustrated by FIG. 2 consist of the resonance capacitor 701 coupled in series (or in parallel) to the power transfer transmitter inductor 103.

The power transfer signal is generated by driving the transmitter resonance circuit from a driver 703 generating a drive signal with a suitable drive frequency (typically in the 20-200 kHz frequency range), as illustrated by FIG. 7

The driver 703 generates a varying (and typically AC) voltage drive signal which is applied to the resonance capacitor 701 and transmitter coil 103. In the example, the power transfer resonance circuit is a series resonance circuit, and the voltage drive signal is applied across the capacitor and inductor (thereby also providing a drive signal to the transmitter coil 103). In some embodiments, the driver 703 may be coupled directly (or indirectly) to the transmit coil 103 and the voltage drive signal may be provided to the transmit coil 103. In some embodiments, the drive signal may be a current drive signal. This may in particular be suitable in embodiments wherein the resonance circuit is a parallel resonance circuit whereas a voltage drive signal may often be used for series resonance circuits.

Thus, in the system, the driver 703 generates a drive signal which is fed to the power transfer resonance circuit/transmit coil 103, causing the transmit coil 103 to generate the power transfer signal providing the main power to the power receiver 105.

Figure 8:
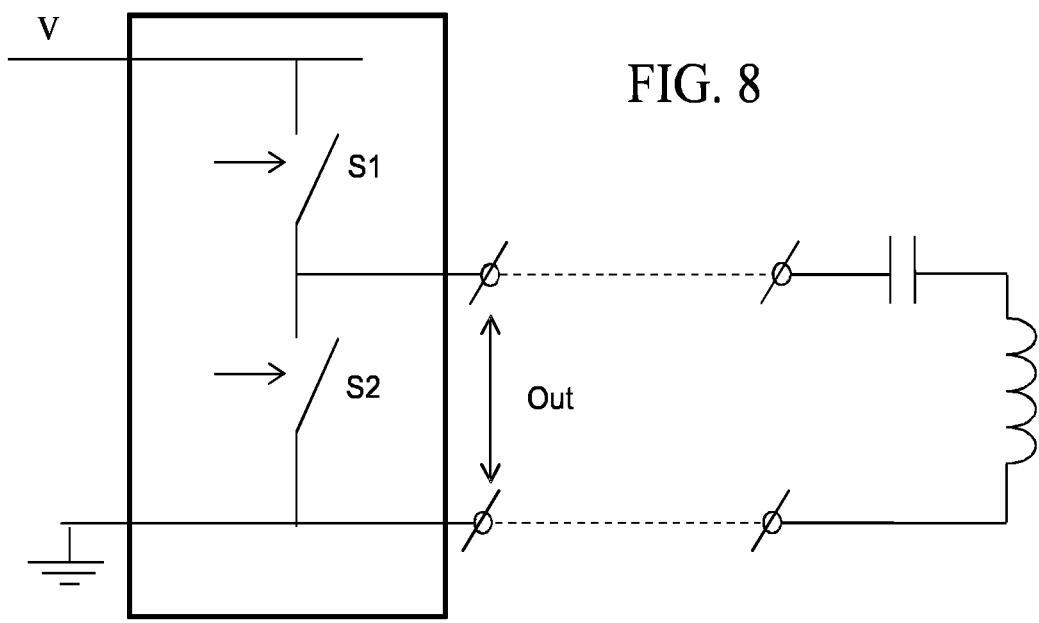
FIGS. 8-9 illustrate examples of elements of a driver for a power transmitter in accordance with some embodiments of the invention.
Figure 9:
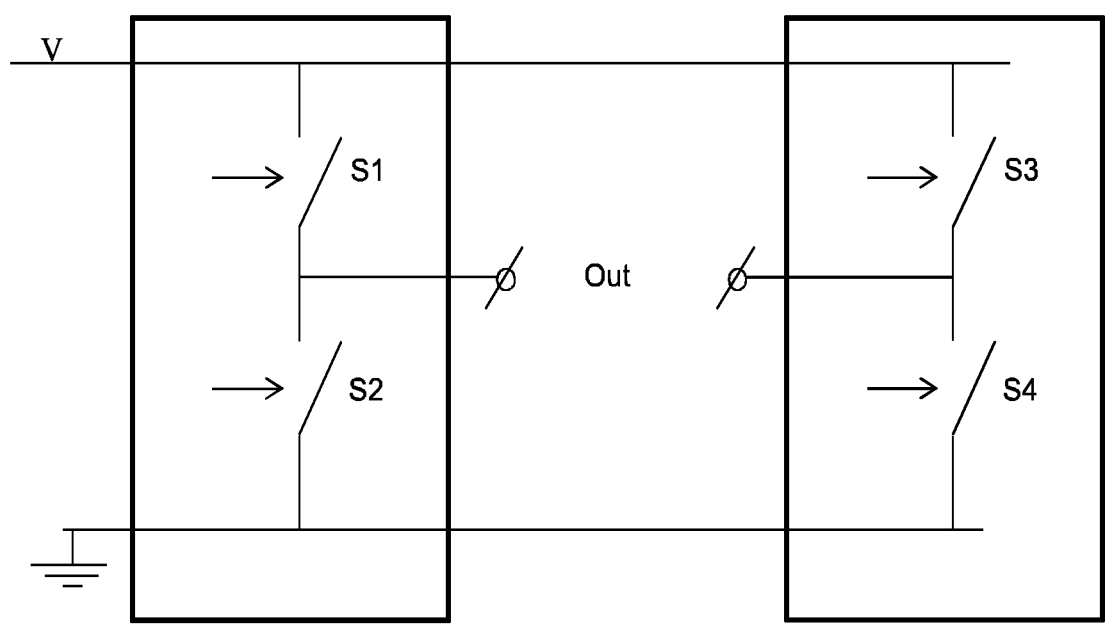

The driver 703 is typically a drive circuit in the form of an inverter which generates an alternating signal from a DC Voltage. The output of the driver 703 is typically a switch bridge generating the drive signal by the appropriate switching of switches of the switch bridge. FIG. 8 shows a half-bridge switch bridge/inverter. The switches S1 and S2 are controlled such that they are never closed at the same time. Alternatingly S1 is closed while S2 is open and S2 is closed while S1 is open. The switches are opened and closed with the desired frequency, thereby generating an alternating signal at the output. Typically, the output of the inverter is connected to the transmitter coil via a resonance capacitor. FIG. 9 shows a full-bridge switch bridge/inverter. The switches S1 and S2 are controlled such that they are never closed at the same time. The switches S3 and S4 are controlled such that they are never closed at the same time. Alternatingly switches S1 and S4 are closed while S2 and S3 are open, and then S2 and S3 are closed while S1 and S4 or open, thereby creating a square-wave signal at the output. The switches are open and closed with the desired frequency.

The above description corresponds to the case where the left and right bridge are 180° out of phase and provide the maximum output power or maximum duty cycle. However, in other scenarios, the bridge halves may be partial out of phase. If the bridge halves are in phase resulting in both S2 and S4 or S1 and S3 being closed simultaneously, the bridge voltage will be zero. By controlling the phase between the two bridge halves, the duty cycle of the drive signal and as a result the output power of the drive signal can be controlled.

The driver 703 accordingly generates a drive signal which has a given drive frequency. The drive signal is applied to the primary resonance circuit 201 thereby generating the power transfer signal.

The driver 703 is also coupled to the transmitter controller 111 which comprises control functionality for operating the power transfer function, and which may specifically comprise a controller arranged to operate the power transmitter 101 in accordance with the protocol according to which the system operates, such as e.g. in accordance with the Qi Specification (or the approach defined by the Kitchen Work Group). For example, the transmitter controller 111 may be arranged to control the power transmitter 101 to perform the different Qi phases, including the Identification and Configuration phase and the power transfer phase.

In the example, the power transmitter 101 comprises a single transmitter coil 103 which is driven by the driver 703. Thus, the wireless inductive power transfer signal is generated by a single transmitter coil 103. However, it will be appreciated that in other embodiments, the wireless inductive power signal may be generated by a plurality of transmitter coils driven e.g. in parallel by the driver. Specifically, multiple transmitter coils driven by corresponding (dependent) output signals of the driver 703 may be used to generate the wireless inductive power signal. For example, two transmitter coils may be positioned at different positions to provide two charging points for two power receivers. The two coils may be fed the same output signal from the driver 703. This may allow an improved distribution of the wireless inductive power signal/magnetic field in order to support multiple charging points.

The above described power transfer circuit 109 thus provides a power transfer signal which is active during a power transfer operation. However, the power transmitter 101 is typically not required to be active very frequently and accordingly can also operate in a standby phase where no power transfer signal is provided. In the system, the power transmitter communication circuit 119 may generate an inductive communication signal which as described may also provide auxiliary power to the power receiver 105, typically for use when the power transfer signal is not active.

The power transmitter communication circuit 119 thus provides a bidirectional communication channel for communication with the power receiver 105. The communication is based on a communication carrier in the form of the inductive communication signal which is AM modulated in the forward direction and load modulated in the reverse direction. The inductive communication signal further provides a secondary or auxiliary power transfer to the power receiver 105.

In the example of FIG. 7, the power transmitter communication circuit 119 also comprises a resonance circuit which henceforth will be referred to as the communication resonance circuit In the example, the communication resonance circuit is formed by the transmitter communication coil 121 and a parallel capacitor 705, henceforth referred to as the communication capacitor 705. The communication resonance circuit is driven by a communication driver 707 which generates a suitable drive signal for generating the inductive communication signal.

Thus, the power transmitter communication circuit 119 includes a resonance tank or resonance circuit which is formed by an inductive impedance and a capacitive impedance. In the example of FIG. 7, the inductive impedance is formed by a single inductor, namely the transmitter communication coil 121, and the capacitive impedance is formed by a single communication capacitor 705.

The power transfer resonance circuit may typically be a serial or parallel resonance circuit, and may in particular as illustrated by FIG. 7 consist of the communication capacitor 705 coupled in parallel to the transmitter communication coil 121. The communication resonance circuit may correspond to the active tuning network 205 of FIG. 5.

The inductive communication signal is generated by driving the communication resonance circuit by a driver 707 generating a drive signal with a frequency much higher than the drive frequency for the power transfer signal. In most embodiments, the frequency is above 10 MHz and in the specific example it is 13.56 MHz.

The communication driver 707 may use a similar approach to the power transfer driver 703. Thus, the description provided for this may also be considered to apply mutatis mutandis to the communication driver 707. However, the communication driver 707 generates a drive signal with a much higher frequency and much lower maximum power level.

Similarly, the comments provide with respect to the generation and nature of the power transfer signal may apply mutatis mutandis to the inductive communication signal.

The communication driver 707 may in the specific example include a front end IC 201, RF amplifier 301, and receiver/transmit filter 203 as described with reference to FIG. 5.

The power transmitter communication circuit 119 may further comprise a load demodulator 709 arranged to demodulate data transmitted by the power receiver 105 by load modulation. Specifically, the load demodulator 709 is arranged to demodulate load modulation of the inductive communication signal to determine the corresponding data transmitted from the power receiver 105. The load demodulator 709 is thus arranged to demodulate load modulation of the inductive communication signal by the power receiver.

On the physical level, the communication channel from the power receiver 105 to the power transmitter 101 is implemented by using the inductive communication signal as a communication carrier for the load modulation. The power receiver 105 transmits data messages by modulating the load of the receiver communication coil 123. The load modulation may e.g. be detected by a change in the amplitude and/or phase of the drive signal current/voltage, by a change in the current/voltage of the transmitter communication coil 121, and/or a change of current/voltage of the communication resonance circuit. As another example, the load modulation may be detected by a change in the current of the power supply to the communication driver 707 (specifically to the inverter/switch bridge). In the specific example, the load demodulator 709 may be implemented as part of the front end IC 201.

The power transmitter communication circuit 119 further comprises a modulator 711 which may correspond to the modulator 501 of FIG. 5. The modulator 711 is arranged to AM modulate the inductive communication signal for transmission of data to the power receiver 105. However, rather than directly AM modulating the drive signal for the communication resonance circuit, the modulator 711 is arranged to modulate the inductive communication signal by varying the resonance frequency of the communication resonance circuit in response to the data values that are to be transmitted to the power receiver 105.

Thus, in the example, the communication resonance circuit is a variable resonance circuit which has a variable resonance frequency. Specifically, the resonance circuit comprises at least one impedance which can be varied in response to a control signal provided by the modulator 711. Specifically, at least one of the capacitive and the inductive impedance of the communication resonance circuit can be varied in response to a control signal. By varying the impedance, and specifically the reactance of at least one of the (resonating) impedances of the communication resonance circuit, the resonance frequency of the resonance circuit can be varied. For example, the communication capacitor 705 may be a variable capacitor which can be varied in response to a control signal (for example, it may be a voltage dependent capacitor which can be modified by changing a DC voltage across the communication capacitor 705).

In the example, the modulator 711 is arranged to generate a control signal which controls a variable impedance and thus the resonance frequency of the communication resonance circuit. The modulator 711 is coupled to the transmitter controller 111 and is arranged to generate the control signal in response to the data values that are to be transmitted to the power receiver 105. The modulator 711 accordingly controls the resonance frequency of the communication resonance circuit in dependence on the data values being transmitted to the power receiver.

Specifically, the modulator 711 is arranged to control the variable impedances such that the resulting resonance frequency results in a desired variation in the amplitude of the generated inductive communication signal in accordance with the desired AM modulation protocol. For example, amplitude variations consistent with the ISO/IEC 14443-2, Type B modulation scheme may be applied.

The modulator 711 may accordingly AM modulate the inductive communication signal in dependence on the data being transmitted by controlling and varying the resonance frequency of the communication resonance circuit. As a simple example, each possible channel data symbol may be associated with a relative amplitude level (e.g. a "higher" or "lower" value) and the modulator 711 may select the resonance frequency to correspond to the amplitude associated with a given data value. For example, a binary value of "0" may be transmitted by setting the resonance frequency of the communication resonance circuit to the same value as the drive frequency (13.56 MHz) and a binary value of "1" may be transmitted by setting the resonance frequency to a different value (say 15 MHz) resulting in the amplitude of the inductive communication signal being reduced. In some embodiments, each possible data value may be associated with a pattern of amplitudes rather than a single amplitude value.

In some embodiments, the AM modulation may thus be achieved by varying the amplitude between a fixed number of amplitudes, and specifically between two different amplitudes. In such embodiments, the modulator 711 may be arranged to switch the variable impedance of the communication resonance circuit between a corresponding number of fixed values. For example, the communication capacitor 705 may be switched between two values. This may e.g. be achieved by connecting/disconnecting a parallel capacitor.

Thus, in many embodiments, the communication resonance circuit may comprise a switch arranged to short circuit or disconnect one or more capacitors of the capacitive impedance in response to a control signal from the modulator 711.

The communication capacitor 705 may for example be implemented by a plurality of parallel capacitors each of which is in series with a switch. For example, a plurality of capacitors with each capacitor approximately having half the capacitance of the previous capacitor may be provided. By switching the individual capacitor in or out, any capacitance up to twice the capacitance of the largest capacitor can be achieved with a resolution corresponding to the capacitance of the smallest capacitor.

In many embodiments, the number of capacitors equals the number of possible amplitudes and the number of switches is one less than the number of possible amplitudes. For example, if only two amplitudes are used, the communication capacitor 705 may comprise one capacitor which is always actively coupled in the circuit, i.e. it is always connected in a resonating configuration with the transmitter communication coil 121. Further, together with the transmitter communication coil 121, the first capacitor results in a resonance frequency equal to the highest of the two possible values, such as e.g. in a resonance frequency of 15 MHz. In addition, a second capacitor may be connected in parallel to the first capacitor and with a switch in series. The two capacitors may together have a capacitance that together with the inductance of the transmitter communication coil 121 results in a resonance frequency equal to the frequency of the drive signal (13.56 MHZ). The control signal may be used to switch the switch between the open and closed state, and thus may connect/disconnect or couple/decouple the second capacitor from the transmitter communication coil 121. Specifically, when the lowest amplitude is required, the control signal sets the switch in an open configuration and when the highest amplitude is required, the control signal sets the switch to a closed configuration.

Figure 10:
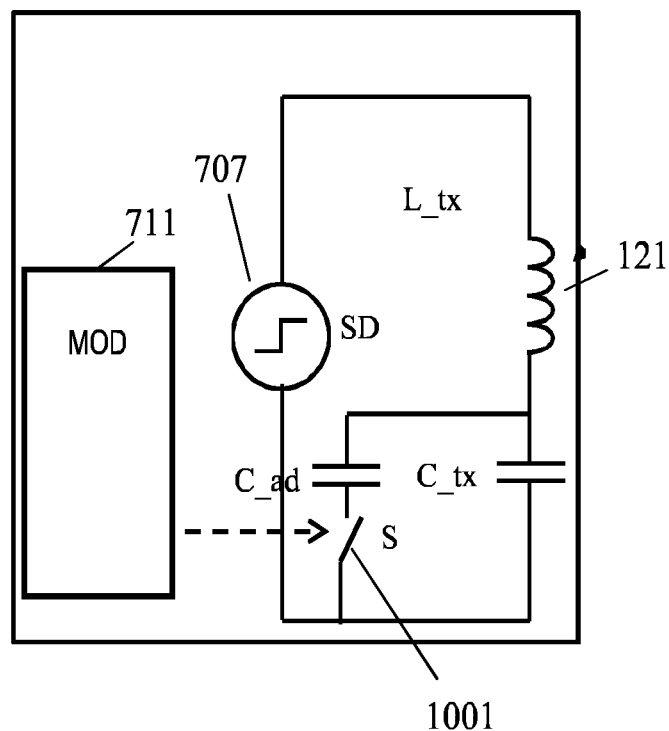
FIG. 10 illustrates an example of elements of a power transmitter in accordance with some embodiments of the invention.

An example of such an approach is illustrated in FIG. 10 (which illustrates an example where the communication resonance circuit is a series resonance circuit rather than a parallel resonance circuit). In the example, the AM modulation is achieved by switching the resonance frequency of the communication resonance circuit between two values. Thus, the modulator 711 selects the resonance frequency from a set of two frequencies depending on the data to be transmitted. However, the frequency and the amplitude of the drive signal are independent of the data and thus do not change as a function of this. Specifically, the amplitude and frequency may be constant and even predetermined.

The selection of the resonance frequency may, depending on the modulation scheme used, either be for the entire symbol duration or may e.g. be in shorter intervals in accordance with a predetermined pattern for the data value/symbol.

As the frequency modulation uses two frequencies, the communication capacitor 705 is formed by two capacitors C_ad and C_tx with one capacitor C_tx continuously being connected in the resonance circuit and the other C_ad being coupled in series with a switch 1001 and with the series connection of the capacitor C_ad and the switch 1001 being coupled in parallel to the permanently engaged capacitor C_tx. The switch 1001 can be switched between an open state and a closed state in response to the control signal generated by the modulator 711.

In the example, the control signal is a binary control signal which switches the switch 1001 between an open and closed state. When the switch is open, the capacitor C_ad is disconnected from the resonance circuit and the resonance frequency is given only by the values of the transmitter communication coil 121 (represented by L_tx in FIG. 10) and the capacitor C_tx. The values of these components are selected such that this resonance frequency corresponds to a higher frequency than the drive frequency and thus result in a lower amplitude.

When the switch is closed, the capacitor C_ad is connected in parallel with capacitor C_tx and the two capacitors thus form an effective resonance capacitor with a capacitance equal to the sum of the individual capacitances. The resonance frequency is given by the value of the transmitter communication coil 121 and this combined capacitor. The value of the capacitor C_ad is then selected such that this resonance frequency corresponds to the drive frequency resulting in a higher amplitude.

As another example, for a switchable capacitor in series with another capacitor (which may or may not be switchable), a binary control signal provided by the modulator 711 may be arranged to connect or short-circuit the switchable capacitor. The switch may specifically be in parallel with the capacitor and may open to connect the switchable capacitor in series with the other capacitor (with the total capacitance accordingly being given by the resulting series capacitance) and close to short-circuit the switchable capacitor (and thus with the total capacitance being given only by the second capacitor).

As another example, for a switchable inductor in parallel with the transmitter communication coil 121, the binary control signal may be arranged to connect or disconnect the switchable inductor. The switch may specifically be in series with the inductor and may open to disconnect the switchable inductor and close to connect the switchable inductor (resulting in the total resonating inductance being given as the parallel inductance of two inductors).

As another example, for a switchable inductor in series with the transmitter communication coil 121, the binary control signal may be arranged to connect or short-circuit the switchable inductor. The switch may specifically be in parallel with the inductor and may open to connect the switchable inductor in series with the transmitter communication coil 121 (with the total inductance accordingly being given by the resulting series inductance) and close to short-circuit the switchable inductor (and thus with the total inductance being given only by the transmitter communication coil 121).

Figure 11:
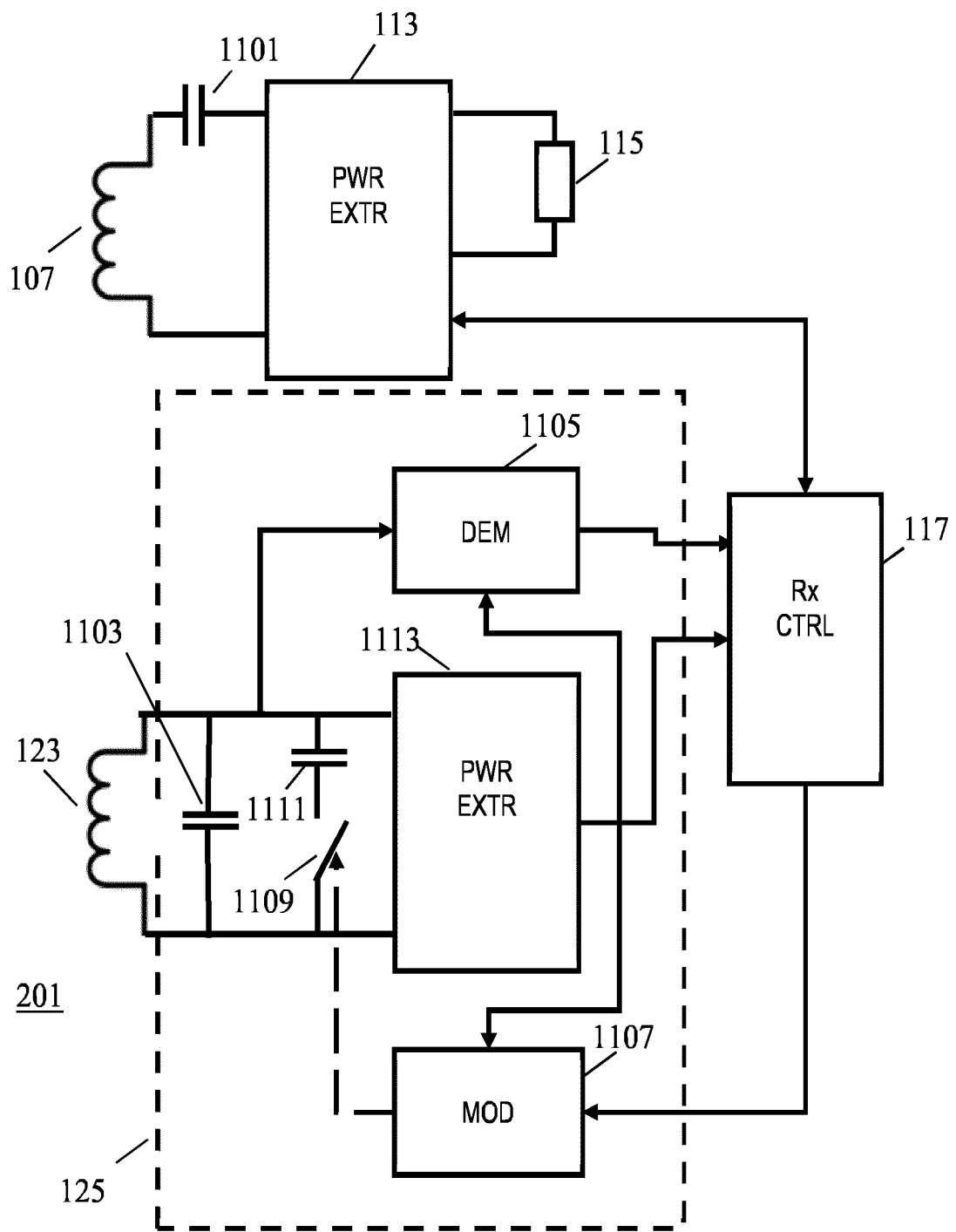
FIG. 11 illustrates an example of elements of a power receiver in accordance with some embodiments of the invention.

FIG. 11 illustrates an example of an embodiment of the power receiver 105 of FIG. 1.

In the example, the input circuit of the power receiver 105 also includes a resonance circuit or resonance tank which includes the receiver inductor 107 and a receiver power transfer capacitor 1101. The receiver resonance circuit may typically be a serial or parallel resonance circuit, and may in particular as shown in FIG. 11 consist of the receiver power transfer capacitor 1101 coupled in parallel (or series) to the receiver inductor 107. The receiver resonance circuit is typically tuned to the frequency of the power transfer signal, i.e. to a frequency in the range from 20 KHz to 200 KHz in the specific example. This tends to improve communication performance and power transfer performance.

The receiver resonance circuit is coupled to the power extractor circuit 113 which converts the received power transfer signal, i.e. the induced signal provided by the receiver resonance circuit, into a power that is provided to the external load 115 (typically by performing AC/DC conversion potentially followed by voltage regulation as will be well known to the skilled person). Thus, the power extractor circuit 113 is arranged to extract power from the inductive power transfer signal and to power a load using the extracted power.

In the example, the power receiver 105 further comprises a receiver communication resonance circuit formed by the receiver communication coil 123 and a receiver communication capacitor 1103. The receiver communication resonance circuit is tuned to the frequency of the inductive communication signal, i.e. to a frequency of 13.56 MHz.

The receiver communication resonance circuit is coupled to an AM demodulator 1105 which is arranged to demodulate AM modulation of the inductive communication signal. Thus, the AM demodulator 1105 may demodulate the AM modulation introduced by the modulator 711. The AM demodulator 1105 is coupled to the power receiver controller 117 which is fed the demodulated data.

The power receiver communication circuit 125 further comprises a load modulator 1107 which is coupled to the power receiver controller 117. The power receiver controller 117 may provide data for transmission to the power transmitter 101 and the load modulator 1107 may load modulate the inductive communication signal in response to the data such that this can be demodulated by the power transmitter 101. Specifically, a load in the form of a capacitor 1111 in series with a switch 1109 is coupled in parallel to the receiver communication resonance circuit. The load modulator 1107 can control the switch 1109 thereby varying the load provided to the inductive communication signal. In this way, the inductive communication signal can be load modulated.

The receiver communication resonance circuit is further coupled to a power extractor 1113 which is arranged to extract power from the inductive communication signal and to power at least some parts of the power receiver 105 for at least some time. In the specific example, the power extractor 1113 may power the load modulator 1107 and the AM demodulator 1105 as well as part of the power receiver controller 117 at times where an inductive communication signal is present but no power transfer signal is present.

Thus, the inductive communication signal may provide a secondary or auxiliary power transfer which can power elements of the power receiver 105 when the main power transfer signal is not present. The maximum power level of this auxiliary power signal is lower than the main power transfer signal and therefore will not power the load 115 and indeed will typically only power part of the internal power receiver circuitry. Nevertheless, the auxiliary power will allow some functionality to be available without requiring the power transmitter to provide a power transfer signal.

The approach may be particularly suitable for a standby mode and for initializing power transfer.

Initially, the power transmitter 101 may be in a standby mode with e.g. no power receiver being present. When a power receiver 105 is detected to be present, e.g. when a kitchen appliance is placed on top of the power transmitter 101, the power transmitter 101 may seek to initialize a power transfer to the power receiver 105. However, rather than generate a power transfer signal, it may first generate only the inductive communication signal.

In response to the generation of the inductive communication signal, the power extractor 1113 may extract power and provide this to the relevant parts of the power receiver 105. The power transmitter 101 and power receiver 105 may then proceed to perform a power transfer initialization process by exchanging messages using AM modulation of the inductive communication signal in the forward direction and load modulation in the reverse direction.

Thus, the initialization process includes generating data values corresponding to power transfer initialization control data and communicating these between the power transmitter 101 and the power receiver 105. Such data and messages may e.g. include identification, negotiation/setting of power transfer parameters etc. as will be appreciated by the skilled person.

If the power transfer initialization process is successful, the power transmitter 101 may proceed to generate a power transfer signal with operating parameters as determined by the initialization process.

The power receiver 105 may then proceed to extract power from the power transfer signal and may supply the external load 115 with the required power. It may also begin to power parts of the power receiver 105 that were not before powered from the inductive communication signal. In addition, it may proceed to power the circuitry that was previously powered by the power extractor 1113 and thus the power extraction from the inductive communication signal may be reduced or minimized.

The approach may provide a highly efficient system which may allow efficient communication yet allow low complexity and low loss implementations.

A critical parameter when performing AM modulation is to provide a suitable modulation depth, i.e. for a suitable degree of variation in the amplitude as a result of the amplitude modulation. In simple AM communication systems, the carrier may simply be switched on and off, i.e. a 100% modulation depth may be applied. However, such an approach is not ideal for many applications and indeed is unsuitable for systems wherein the carrier not only provides communication but is also used to transfer power to a receiver. In such systems, there is a conflict between the desire to effectively transfer power using the carrier and the desire to communicate data by selectively varying (reducing) the amplitude of the carrier. Typically, the optimum trade-off is for the modulation depth to be kept at the minimum level that still allows sufficiently reliable communication.

In order to achieve optimum performance, it is therefore required that the modulation depth is carefully controlled. However, this is in practice typically very difficult to achieve when the AM modulation is not generated by varying e.g. a voltage of a drive signal but rather is controlled by adjusting a resonance frequency of a resonance circuit. Indeed, component tolerances and variations (e.g. due to temperature variations or end-of-life variations etc.) of capacitors and especially inductors are typically very high and provide a high degree of variation and uncertainty for the resulting modulation depth. Therefore, it will typically be necessary to design the circuit such that the different resonance frequencies corresponding to different data is in the worst case situation sufficient to ensure a sufficient modulation depth. However, as a consequence, the system will typically operate with a modulation depth that is much higher than necessary, and this may substantially degrade the power transfer performance.

In the following an approach of controlling the resonance frequency of the resonance circuit such that an accurate modulation depth can be achieved will be described.

A particular advantage of the approach is that it may provide a resonance frequency control, and thus an AM modulation which has a much reduced sensitivity to component variations and tolerances of the components of the resonance circuit. In particular, it may allow the effective resonance frequency to be controlled to match a frequency of a drive signal rather than depending on the component values. Thus, the approach may allow the modulation depth to be carefully controlled and to be less sensitive to component variations. This may allow the modulation depth to be set much closer to the optimum, and thus can provide an improved trade-off with both reliable communication performance and efficient power transfer. Specifically, the communication resonance circuit may comprise a resonance modification circuit which is arranged to control the variable resonance frequency by slowing a state change for at least one of the capacitive impedance and the inductive impedance for a fractional time interval of at least some cycles of the drive signal from the communication driver 707. For example, during each cycle of the drive signal, the state change of the communication capacitor 705 is frozen for a given time interval by the communication capacitor 705 being short circuited following a zero crossing of the voltage over the communication capacitor 705.

The resonance modification circuit is arranged to adapt the duration of the fractional time interval in response to the control signal. For example, the resonance modification circuit may be arranged to switch between two different durations, corresponding to two different effective impedance values (and thus two different effective resonance frequencies), in response to the state of a binary control signal provided by the modulator 711.

Figure 13:
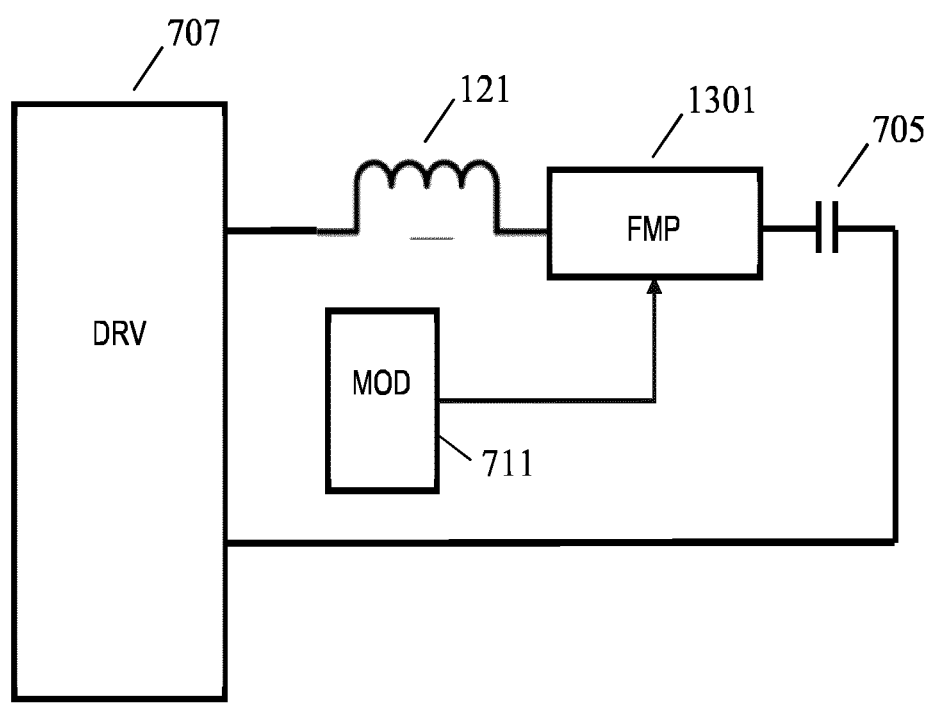
FIG. 13 illustrates an example of elements of a power transmitter in accordance with some embodiments of the invention.

FIG. 13 illustrates elements of an example of elements of the power transmitter communication circuit 117 wherein the effective resonance frequency can reduced by slowing the state change for a fractional time interval of some, and typically all, cycles of the communication drive signal.

In the example, the communication resonance circuit comprises the transmitter communication coil 121 and the communication capacitor 705 but it will be appreciated that the described principles will also be applicable to e.g. more complex impedances (and specifically may be applicable to any resonance circuit using a suitable inductive impedance and capacitive impedance).

Indeed, the transmitter communication coil 121 of FIG. 13 correspond directly to an inductor generating the inductive communication signal but it will be appreciated that in other embodiments the inductive impedance may be considered to be any e.g. one port/two-terminal element which has an at least partial inductive impedance, i.e. which has an inductive reactance component, or in other words which has a complex impedance with a positive imaginary part.

Similarly, in the specific example, the communication capacitor 705 corresponds directly to a single capacitor but it will be appreciated that in other embodiments the communication capacitor 705 could more generally be considered to represent any e.g. one port/two-terminal element which has an at least partial capacitive impedance, i.e. which has a capacitive reactance component, or in other words which has a complex impedance with a negative imaginary part.

It will be appreciated that in most embodiments, the resistive part of the inductive and capacitive impedances will typically be insignificant, and often negligible, compared to the reactance part. This will ensure that the oscillations are relatively undamped, i.e. it will provide a relatively high Q for the resonance circuit.

For clarity and brevity, the following description will focus on the inductive impedance being an (ideal) inductor and the capacitive impedance being an ideal capacitor 705. For brevity, the pair of the transmitter communication coil 121 and communication capacitor 705 will also be referred to as the resonating components.

The transmitter communication coil 121 and communication capacitor 705 are coupled together in a resonant configuration. In the example, the transmitter communication coil 121 and communication capacitor 705 are coupled in series resonance but it will be appreciated that in other embodiments they may be coupled in a parallel resonance configuration.

The transmitter communication coil 121 and communication capacitor 705 will exhibit a natural resonance frequency corresponding to the resonance frequency of a resonance circuit comprising only the transmitter communication coil 121 and the communication capacitor 705. As is well known, the resonance frequency for such a circuit is by $1/2\pi\sqrt{LC}$ where L is the inductance of the transmitter communication coil 121 and C is the capacitance of the communication capacitor 705.

However, in the system of FIG. 13, the communication resonance circuit further comprises a resonance modification circuit 1301 which is arranged to control the resonance frequency for the transmitter resonance circuit by slowing a state change for the communication capacitor 705 and/or the transmitter communication coil 121. The resonance modification circuit 1301 can be considered part of the transmitter communication resonance circuit. It will also be appreciated that although the resonance modification circuit 1301 is in FIG. 13 shown as single two terminal element coupled in series between the transmitter communication coil 121 and the communication capacitor 705, this is merely an example and that other configurations will be used in other embodiments. For example, the resonance modification circuit 1301 in the example of FIG. 13 has only two terminals but it will be appreciated that in other embodiments, the resonance modification circuit 1301 may have more terminals and may be connected to other parts of the circuit, including e.g. to power supply rails for the driver 205.

The resonance modification circuit 1301 is arranged to modify the resonance frequency by slowing a state change for one or both of the transmitter communication coil 121 and the communication capacitor 705. The state of the transmitter communication coil 121 and the communication capacitor 705 may be considered to be represented by the current energy values for the component, and specifically may be considered to correspond to the current of the transmitter communication coil 121 ($E=\frac{1}{2}LI^2$) and the voltage of the communication capacitor 705 ($E=\frac{1}{2}CV^2$).

In a conventional resonance circuit formed by a capacitor and inductor, the resonance is achieved by the continuous and periodic phase change that results from the energy flow back and forth between the capacitor (where energy is stored as electrical potential energy) and the inductor (where energy is stored as magnetic potential energy). The speed of state changes and the energy flow in such a system are given by the values of the capacitor and the inductor and this results in the oscillations at the natural resonance frequency of $$f_n = \frac{1}{2\pi\sqrt{LC}}.$$

However, in the system of FIG. 13, the resonance circuit is not allowed to simply perform a free running oscillation but rather the resonance modification circuit 1301 slows down the state change for at least one of the transmitter communication coil 121 and the communication capacitor 705 during a fractional time interval of some, and typically all of cycles.

The state change is thus slowed during the fractional time interval relative to the state change of a free running resonance circuit comprising only the communication capacitor 705 and the transmitter communication coil 121.

Specifically, the state change is slowed by impeding the energy flow between the communication capacitor 705 and the transmitter communication coil 121 (by slowing the energy flow from the transmitter communication coil 121 to the communication capacitor 705, from the communication capacitor 705 to the transmitter communication coil 121, or both from the transmitter communication coil 121 to the communication capacitor 705 and from the communication capacitor 705 to the transmitter communication coil 121). In a free running resonant circuit, positive current flows from the transmitter communication coil 121 to the communication capacitor 705 for half of a resonating cycle, and from the communication capacitor 705 to the transmitter communication coil 121 for the other half of a resonating cycle. In many embodiments, the slowing of the energy flow may be achieved by impeding the current flowing between the resonating components. In many embodiments, the resonance modification circuit 1301 may be arranged to impede current from the transmitter communication coil 121 to the communication capacitor 705, e.g. by leading (some or all of the) current of the transmitter communication coil 121 away from the communication capacitor 705 (including potentially leading both negative and positive currents away from the communication capacitor 705). In other embodiments, the resonance modification circuit 1301 may be arranged to impede current from the communication capacitor 705 to the transmitter communication coil 121, e.g. by disconnecting the communication capacitor 705 from the transmitter communication coil 121 during the fractional time interval (thereby also setting the voltage across the inductor to zero, i.e. both the current and the voltage is set to zero for the inductor).

In these examples, the current flow between the resonating components is thus reduced or even prevented completely during the fractional time interval. During this fractional time interval, the state change of at least one of the components will be slowed or stopped completely. If this is performed during a number of cycles, and specifically in every cycle, the effect will be that the resonance circuit will behave as if resonating at a lower frequency than the natural resonance frequency for the free running resonance circuit configuration.

The resonance modification circuit 1301 may in this way control and adjust the effective resonance frequency to be lower than the natural resonance frequency. The actual effective resonance frequency is in the system of FIG. 13 controlled by the resonance modification circuit 1301 being capable of varying the duration of the fractional time interval. Thus, the longer the fractional time interval is, the larger the effect of slowing the state change will be, and thus the lower will be the effective resonance frequency.

In the example, the resonance modification circuit 1301 is arranged to vary the duration of the fractional time interval in response to the control signal from the modulator 711 and thus is arranged to vary the variable impedance and thus the resonance frequency of the communication resonance circuit under the control of the modulator 711. For example, the resonance modification circuit 505 may be arranged to switch between two predetermined durations in response to the state of a binary control signal. The two durations may be selected to result in an effective resonance frequency corresponding to two frequencies resulting in two different amplitudes as desired by the AM modulation of the inductive communication signal.

Figure 14:
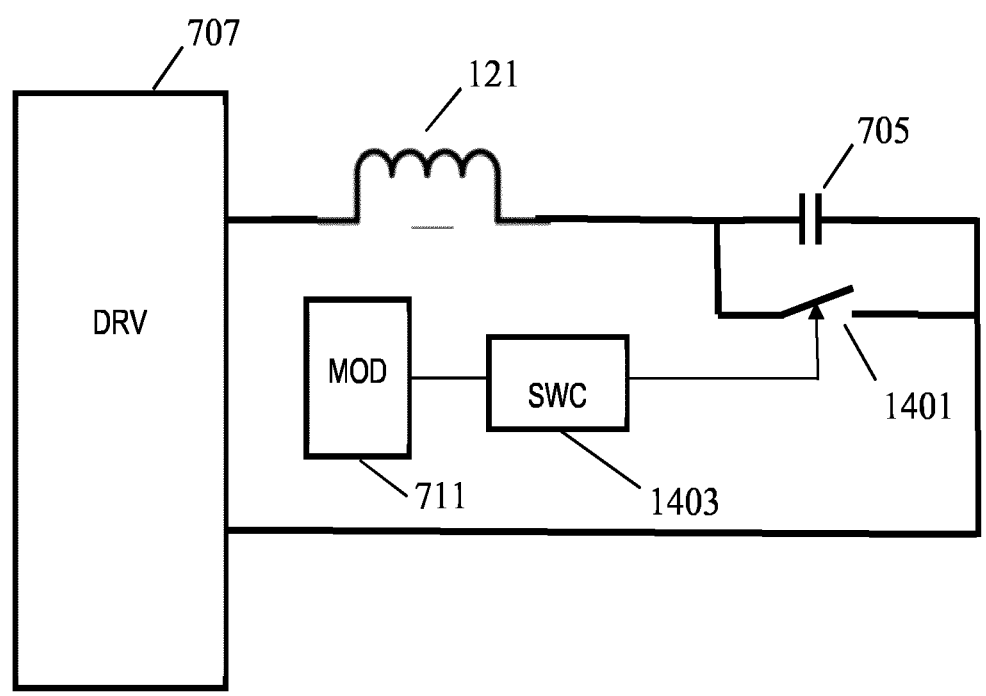
FIG. 14 illustrates an example of elements of a power transmitter in accordance with some embodiments of the invention.

FIG. 14 illustrates an example of the approach of FIG. 13 wherein the resonance modification circuit 1301 is arranged to slow the state change of the communication capacitor 705. In the example, the resonance modification circuit 1301 is arranged to divert current from the transmitter communication coil 121 away from the communication capacitor 705 during the fractional time interval. The diversion is achieved by a switch 1401 which is coupled in parallel with the communication capacitor 705 and which is arranged to short-circuit this.

In the example, the switch 1401 is closed during the fractional time interval. The opening and the closing of the switch 1401 is in the specific example controlled by the transitions of a switch signal generated by a switch controller 1403 in response to the control signal received from the modulator 711.

Specifically, the switch controller 1403 may be arranged to generate a switch signal which in each cycle of the drive signal short-circuits the communication capacitor 705 for a given duration (the fractional time interval) and with the duration depending on the control signal. For example, the switch controller 1403 may apply one of two predetermined durations depending on the control signal where the two durations correspond to resonance frequencies providing two different amplitude values of the inductive communication signal.

When the switch 1401 is closed, the current that is flowing through the transmitter communication coil 121, and which would otherwise charge or discharge the communication capacitor 705, is instead diverted through the switch 1401. Thus, by short circuiting the communication capacitor 705, the current bypasses the communication capacitor 705 and accordingly does not charge the capacitor. In the example, the switch 1401 is arranged to close at a time instant corresponding to the voltage across the communication capacitor 705 being zero. At this time, there is substantial current through the transmitter communication coil 121 (indeed the current will be at the maximum level). However, by short-circuiting the switch, this current is no longer flowing through the communication capacitor 705 but will instead flow through the switch 1401. Accordingly, the short circuit of the communication capacitor 705 ensures that the voltage is maintained at zero, i.e. the state of the communication capacitor 705 is kept constant.

It should be noted that the switch 1401 accordingly forms a current diversion path which may divert both positive and negative current from the communication capacitor 705.

After a certain duration, i.e. at the end of the fractional time interval, the switch is opened again thereby resulting in the current flowing through the transmitter communication coil 121 now flowing into (or out of) the communication capacitor 705. As a result, the communication capacitor 705 starts charging and the capacitor voltage changes accordingly. This will result in the effective capacitance of the communication capacitor 705 as "seen" from the inductor being increased and thus in the resonance frequency being reduced. The resulting effective resonance frequency will depend on the timing of the fractional time interval with increasing duration resulting in reduced effective resonance frequency.

Specifically, by short circuiting the capacitor for part of the period of drive signal, the effective capacitance will be increased.

In order to illustrate this effect, a capacitor C1 may be considered which is charged with an average current $\overline{i(t)}$ for a time t2 to a voltage U1(t2). The voltage U1(t2) may be expressed as:

$$U1(t2) = \frac{1}{C1}\int_0^{t2} \overline{i(t)}dt \rightarrow U1(t2) = \frac{\overline{i(t)} * t2}{C1}.$$

Considering instead another capacitor C2 with a smaller value than C1 but being short circuited from 0 to t1 and charged in the time interval from t1 to t2, this capacitor is charged with the same average current $\overline{i(t)}$ to voltage U1(t2). For C2 the voltage can be determined as:

$$U2(t2) = \frac{1}{C2}\int_0^{t2}\overline{i(t)}dt = \frac{1}{C2}\int_0^{t1} 0 dt + \frac{1}{C2}\int_{t1}^{t2}\overline{i(t)}dt \rightarrow U2(t2) = \frac{\overline{i(t)}*(t2-t1)}{C2}$$

If U1(t2) and U2(t2) are equal at t2, then C1 can be expressed by:

$$C1 = \frac{t2}{t2-t1}*C2.$$

In other words, although capacitor C2 is smaller in value, at time t2 both capacitors are charged to the same voltage. At time t2, capacitor C2 exposes the inductor to the same voltage as capacitor C1. Thus, the effect of the short circuiting is to increase the effective (or apparent) capacitance of the capacitor as "seen" by the inductor. Hence, by varying the duration of the short circuit, the effective capacitance is varied.

Figure 15:
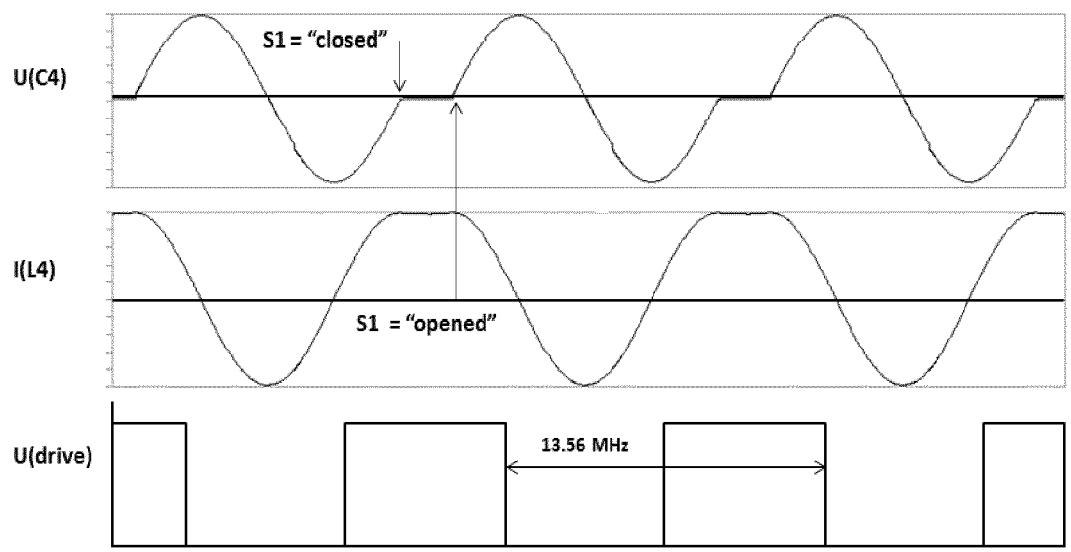
FIG. 15 illustrates examples of signals of a power transmitter in accordance with some embodiments of the invention.

An example of the signals in the circuit of FIG. 14 is provided in FIG. 15. In the example, the lower curve shows the drive signal, the middle curve shows the current through the transmitter communication coil 121, and the upper curve shows the voltage over the communication capacitor 705.

As can be seen, for each cycle, the switch 1401 is arranged to short circuit the communication capacitor 705 during a first fractional time interval (for a positive zero crossing of the capacitor voltage) and during a second fractional time interval (for a zero crossing of the capacitor voltage). In each fractional time interval, the voltage is thus kept constant for a time interval. During this time, the voltage of the communication capacitor 705 does not change. Similarly, the current through the transmitter communication coil 121 hardly changes either (it is almost constant at the maximum value) due to the transmitter communication coil 121 not being exposed to a voltage.

As can be seen, the effective resonance frequency is lowered, and indeed in the example, an effective resonance frequency of 13.56 is achieved despite the natural resonance given by the transmitter communication coil 121 and the communication capacitor 705 is 15 MHz.

The exact effective resonance frequency can be set by adjusting the duration of the fractional time intervals. The longer the duration, the lower the frequency. In the approach, the duration of the fractional time interval is accordingly varied in dependence on the control signal. Thus, the effective resonance frequency is set by controlling the duration of the fractional time intervals rather than being given by the component values of the resonance circuit. The AM modulation resulting from changes in the resonance frequency can accordingly be achieved by adapting the duration of the fractional time intervals. The duration can be set by controlling the timing, and as will be described, often simply by setting the frequency, of the drive signal used to switch the resonance circuit into and/or out of the fractional time interval. Thus, a simple and low complexity adjustment of the resonance frequency in response to the data to be transmitted can be achieved. Further, the operation and modulation is not sensitive to the specific component values, and thus a consistent and well controlled modulation depth can be achieved with low complexity and high reliability.

In some embodiments, the resonance modification circuit may determine the start time of the fractional time interval in response to a signal of the resonance circuit, such as specifically it may determine the start time to coincide with a zero crossing of the voltage over the communication capacitor 705. This may provide a particularly advantageous time for short-circuiting the capacitor as it can reduce or avoid transients and step changes. Further, the end time is determined in response to the control signal, i.e. the duration of the fractional time interval is controlled by controlling the time at which the bypass switch is shifted to the open state thereby allowing the communication capacitor 705 to charge. It will be appreciated that in other embodiments, other times or events of the cycle could be used, and that e.g. the current or voltage of the transmitter communication coil 121 could be used to determine one of the start and end times with the other being controlled in response to the control signal (and thus being varied to vary the effective resonance frequency).

In some embodiments, the combined unit may measure the voltage e.g. over the communication capacitor 705 and generate the switch signal in response to e.g. a detection of a zero crossing. In other embodiments, a bypass switch arrangement may be used which automatically open and/or closes the switch at the appropriate time.

Figure 16:
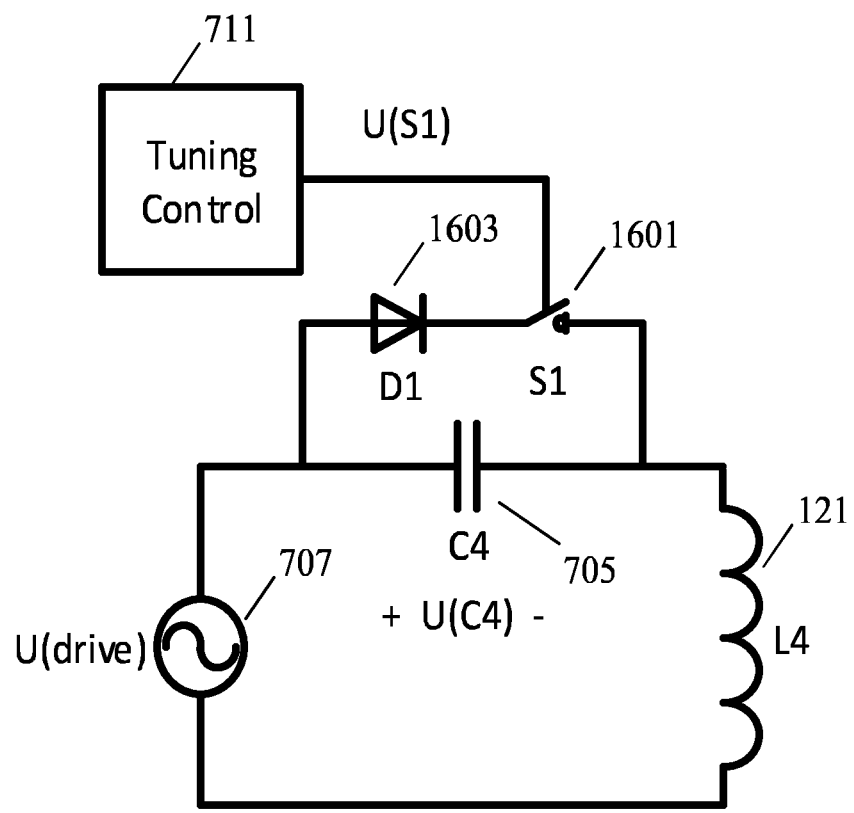
FIG. 16 illustrates an example of elements of a power transmitter in accordance with some embodiments of the invention.

For example, instead of the single bypass switch 1401 of FIG. 14, an arrangement comprising a diode in series with a switch may be used, such as illustrated in FIG. 16. In such an example, the switch 1601 may e.g. be opened at some time during which the voltage over the communication capacitor 705 is negative. As the voltage over the diode 1603 is accordingly also negative, the diode 1603 will not conduct until the voltage over the communication capacitor 705 turns positive (and exceeds the diode conduction voltage). At this stage, the diode 1603 will start to conduct the current. Thus, the voltage over the communication capacitor 705 is frozen at the diode conduction voltage and as this is relatively low (typically around 0.5V), the effect is substantially that the communication capacitor 705 is bypassed at approximately the zero crossing of the capacitor voltage.

After a desired duration, the switch 1601 may then be switched to the open state by the modulator 711 thereby allowing the communication capacitor 705 to be charged. This may facilitate control, and specifically may facilitate the generation of the switch signal controlling the switch as only one transition needs to be accurately timed to achieve a given desired duration of the fractional time interval.

Figure 17:
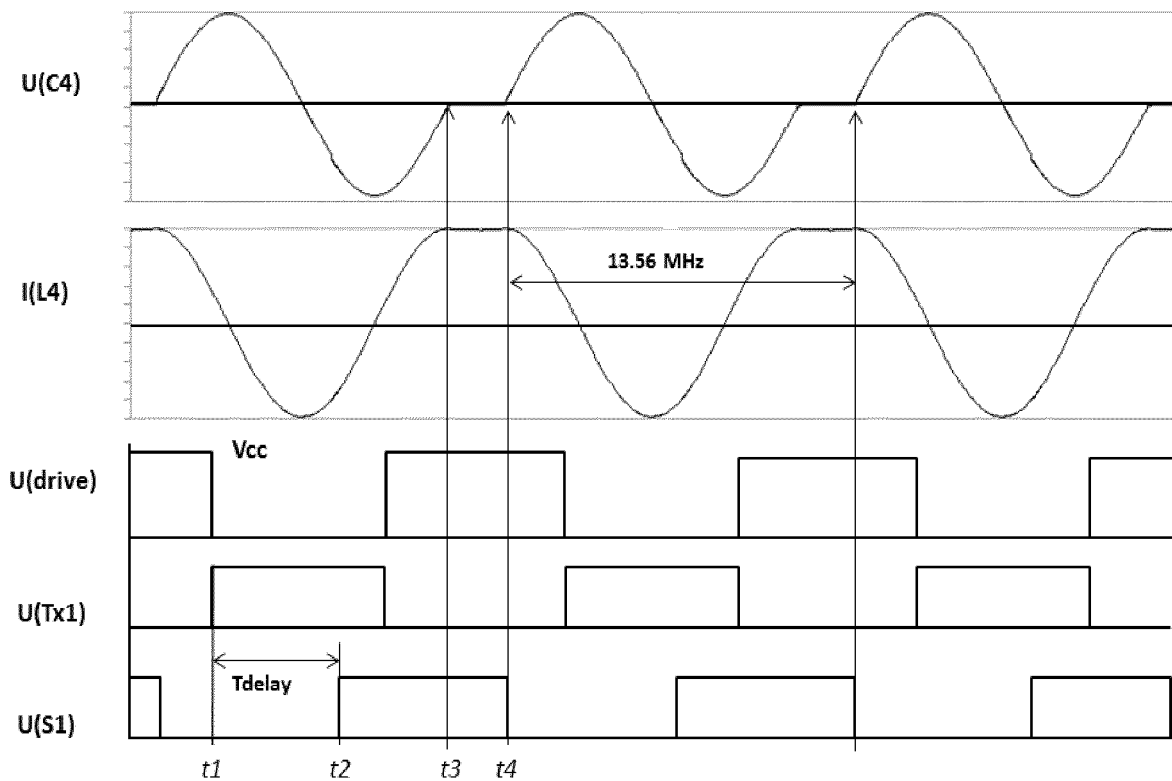
FIG. 17 illustrates examples of signals of a power transmitter in accordance with some embodiments of the invention.

FIG. 17 may illustrate some of the signals and the operation of the approach of FIG. 16.

At time t1 the drive signal (U(Tx1)) switches to a high positive voltage and with a certain delay (Tdelay) a time instant t2, the switch signal for switch 1601 is set to a high value by the modulator 711 thereby closing the switch 1601 (S1). However, no current flows through the switch and the communication capacitor 705 is not short circuited as the voltage over the diode 1603 is negative and therefore it does not conduct. At event t3 the voltage over the diode 1603 changes from being negative to being positive and accordingly the diode 1603 starts conducting thereby clamping the voltage U(C4) over the communication capacitor 705 to (substantially) zero. Thus, in this configuration, the switch 1601 and diode 1603 effectively freezes the states of the communication capacitor 705 and the transmitter communication coil 121. At time t4, the switch 1601 is switched Off by the modulator 711 and the voltage U(C4) is allowed to change and accordingly it starts to become more positive. In this configuration the communication resonance circuit is thus allowed to resonate freely. In this approach, the timing of t4 (more specifically the time from t1 to t4) must be controlled to provide the desired resonance frequency. However, the timing of t2 is less critical, as long as the voltage U(C4) is negative during that event, since the start of the fractional time interval is not given by the switch being closed but rather by the diode 1603 beginning to conduct, i.e. by the time of the zero crossing of the voltage over the communication capacitor 705.

Figure 18:
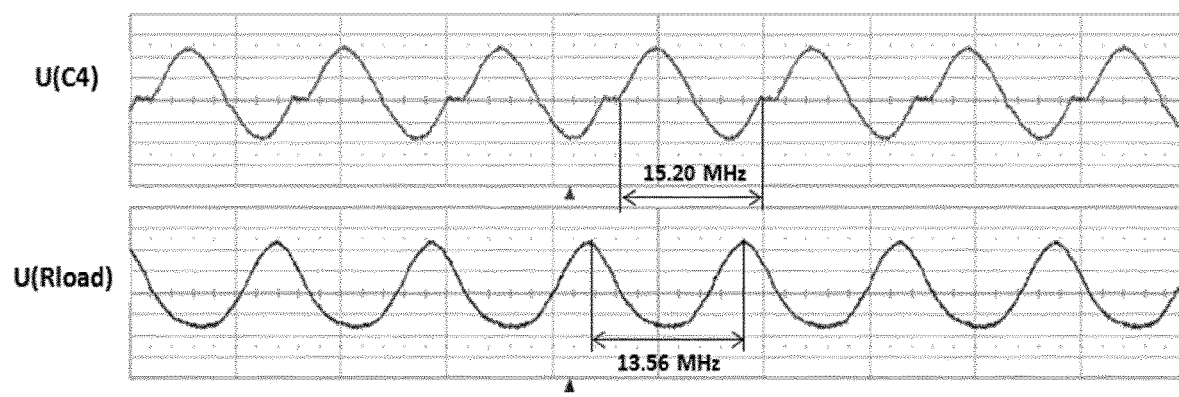
FIG. 18 illustrates examples of signals of a power transmitter in accordance with some embodiments of the invention; of a power transmitter in accordance with some embodiments of the invention.

FIG. 18 illustrates an example of the signals that may be experienced in such a circuit.

The previous text has focused on the example where the resonance modification circuit 1301 is arranged to slow the state change for the communication capacitor 705 (and more generally the capacitive impedance) by diverting current from the transmitter communication coil 121 (more generally the inductive impedance) away from the communication capacitor 705 during the fractional time intervals. However, in other embodiments, the resonance modification circuit 1301 may be arranged to slow the state change for the transmitter communication coil 121 by blocking current flow from the communication capacitor 705 to the transmitter communication coil 121 during the fractional time interval.

Figure 19:
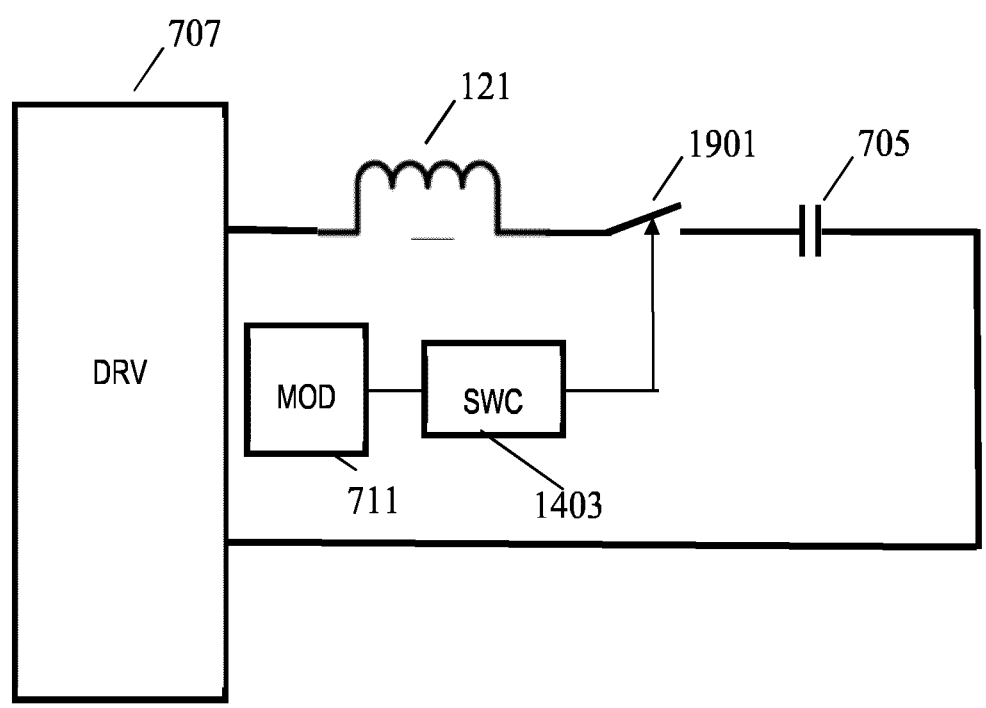
FIG. 19 illustrates examples of signals of a power transmitter in accordance with some embodiments of the invention.

For example, FIG. 19 illustrates an example wherein the resonance modification circuit 1301 is arranged to slow the state change for the transmitter communication coil 121 by impeding current flow (and specifically the rate of change of the current flow) from the communication capacitor 705 to the transmitter communication coil 121 during the fractional time interval, or equivalently by reducing the voltage imposed by the communication capacitor 705 over the transmitter communication coil 121. Specifically, in the example, the resonance modification circuit 1301 is arranged to slow the state change for the transmitter communication coil 121 by blocking current flow from the communication capacitor 705 to the transmitter communication coil 121 during the fractional time interval, or equivalently by setting the inductor voltage to zero.

In the example, the current from the communication capacitor 705 to the transmitter communication coil 121 is blocked by a switch 1901 which is in series with the transmitter communication coil 121. In the example, the resonance modification circuit 1301 is arranged to effectively disconnect the coupling between the communication capacitor 705 and the transmitter communication coil 121 for part of resonance cycle. The operation corresponds to that described for FIG. 14. Indeed, in example of FIG. 14, the switch 1401 is arranged to freeze the voltage across the communication capacitor 705 at zero by controlling the current through the communication capacitor 705 to be zero. In the example of FIG. 19, the switch 1901 is arranged to freeze the current through the transmitter communication coil 121 at zero by disconnecting the transmitter communication coil 121 from the communication capacitor 705 and so removing the influence of the voltage of the communication capacitor 705 on the transmitter communication coil 121. Thus, the two approaches are equivalent with the consideration that operation of a capacitor and inductor are the same when the roles of current and voltage are swapped. Indeed, the signals of FIG. 15 could also apply to the example of FIG. 19 if the curves for inductor current and capacitor voltage are swapped with respectively capacitor voltage and inductor current.

It should also be noted that in the provided examples, the state change of both the communication capacitor 705 and the transmitter communication coil 121 are slowed, or substantially frozen, during the fractional time interval. Indeed, in the example of FIG. 14, during the fractional time interval, no current reaches the communication capacitor 705 and the voltage is constant at zero. However, this also freezes the voltage across the transmitter communication coil 121 to remain constant and thus the inductor current is substantially constant, i.e. there is substantially no state change for the transmitter communication coil 121. Similarly, in the example of FIG. 19, during the fractional time interval, no current can flow from the communication capacitor 705 and accordingly the voltage across the communication capacitor 705 will be substantially constant, i.e. there is substantially no state change for the communication capacitor 705.

In the previous examples, the start of the fractional time intervals have been synchronized with (and specifically aligned to) the zero crossings of respectively the inductor voltage and the capacitor current. In particular, the start time of the fractional time intervals are aligned with the zero crossings of respectively the capacitor voltage and the inductor current. This provides particular advantages when the current flow between the communication capacitor 705 and transmitter communication coil 121 is reduced completely to zero during the fractional time intervals. However, it will be appreciated that in some embodiments, more gradual reductions in the current flow may be used.

It will be appreciated that the slowing of the state change, and the energy flow between the communication capacitor 705 and the transmitter communication coil 121, may be achieved by reducing rather than completely preventing current flow between the resonating components. The reduced current may for example be achieved through a current regulating circuit which e.g. could be controlled in real time by a microcontroller.

Figure 20:
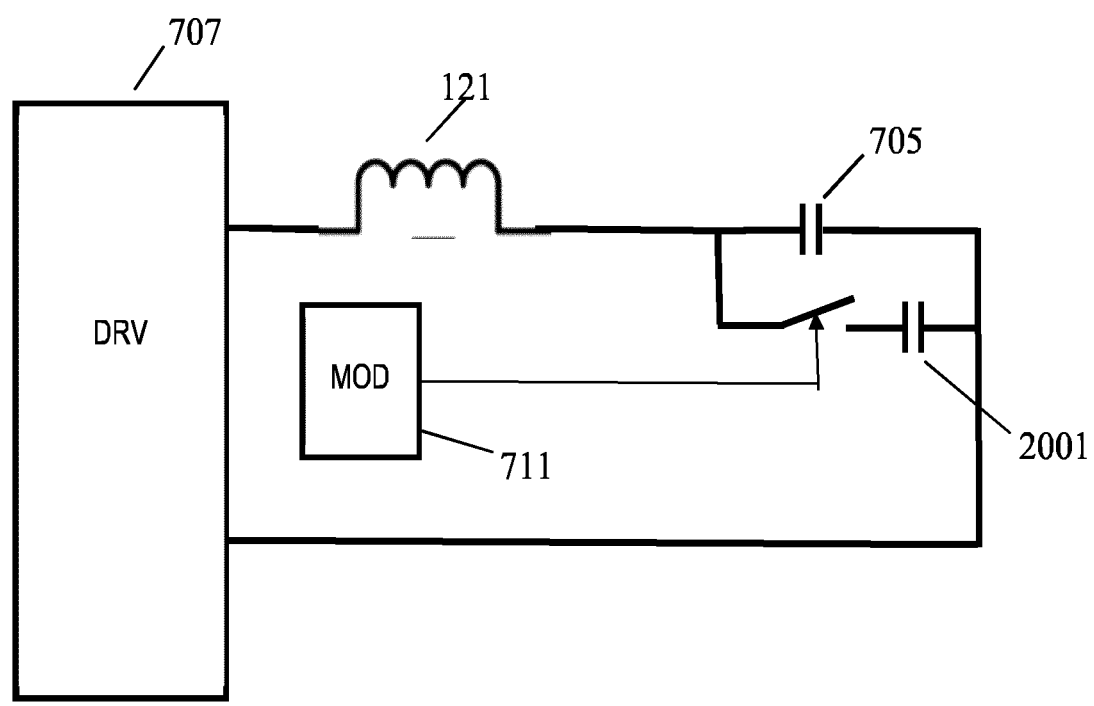
FIG. 20 illustrates an example of elements of a power transmitter in accordance with some embodiments of the invention.

However, as another example, the reduction may e.g. be achieved by including an additional capacitor or inductor during the fractional time intervals. For example, in the example of FIG. 20 an additional current reduction capacitor 2001 is inserted in series with the switch of FIG. 14. During the fractional time interval, the switch 1401 does not short circuit the communication capacitor 705 but inserts the current reduction capacitor 2001 in parallel. This results in the current to the communication capacitor 705 being reduced since part of the current flows into the current reduction capacitor 2001 during the fractional time interval thereby reducing the state change of the communication capacitor 705 and so the voltage that the communication capacitor 705 imposes on the transmitter communication coil 121 (the current reduction capacitor 1401 is charged and discharged together with the communication capacitor 705).

It will be appreciated that a corresponding approach can be used for the transmitter communication coil 121.

The described approach of slowing a state change in fractional time intervals accordingly provides an advantageous approach for effectively modifying the resonance components of the resonance circuit such that the effective resonance frequency is achieved. Indeed, in the described approaches, the fractional time intervals are automatically adapted such that the effective resonance frequency inherently and automatically is the same as the drive frequency. Thus, the effective resonance frequency is given by the drive frequency rather than the component values and thus is insensitive to component tolerances and variations (within reason of course).

The modulator 711 accordingly may control the resonance frequency of the resonance circuit 201 as described with reference to FIGS. 13-20. Specifically, in some embodiments, for a binary data value of "0", the modulator may control the drive frequency for the fractional time intervals to have a first frequency; and for a binary data value of "1", the modulator may control the drive frequency for the fractional time intervals to have a second (different) frequency. The duration of the fractional time intervals may be adapted in response to the data value to be communicated.

As it is well known to accurately and reliable set a frequency of a generated signal (e.g. using a micro-controller implemented oscillator or indeed a DDS (Direct Digital Synthesizer)), the system allows a very accurate control of the effective resonance frequency for the different data symbols. This translates into accurate amplitude levels/variations and thus allows an accurate AM modulation. Specifically, it allows a better controlled amplitude depth.

Figure 12:
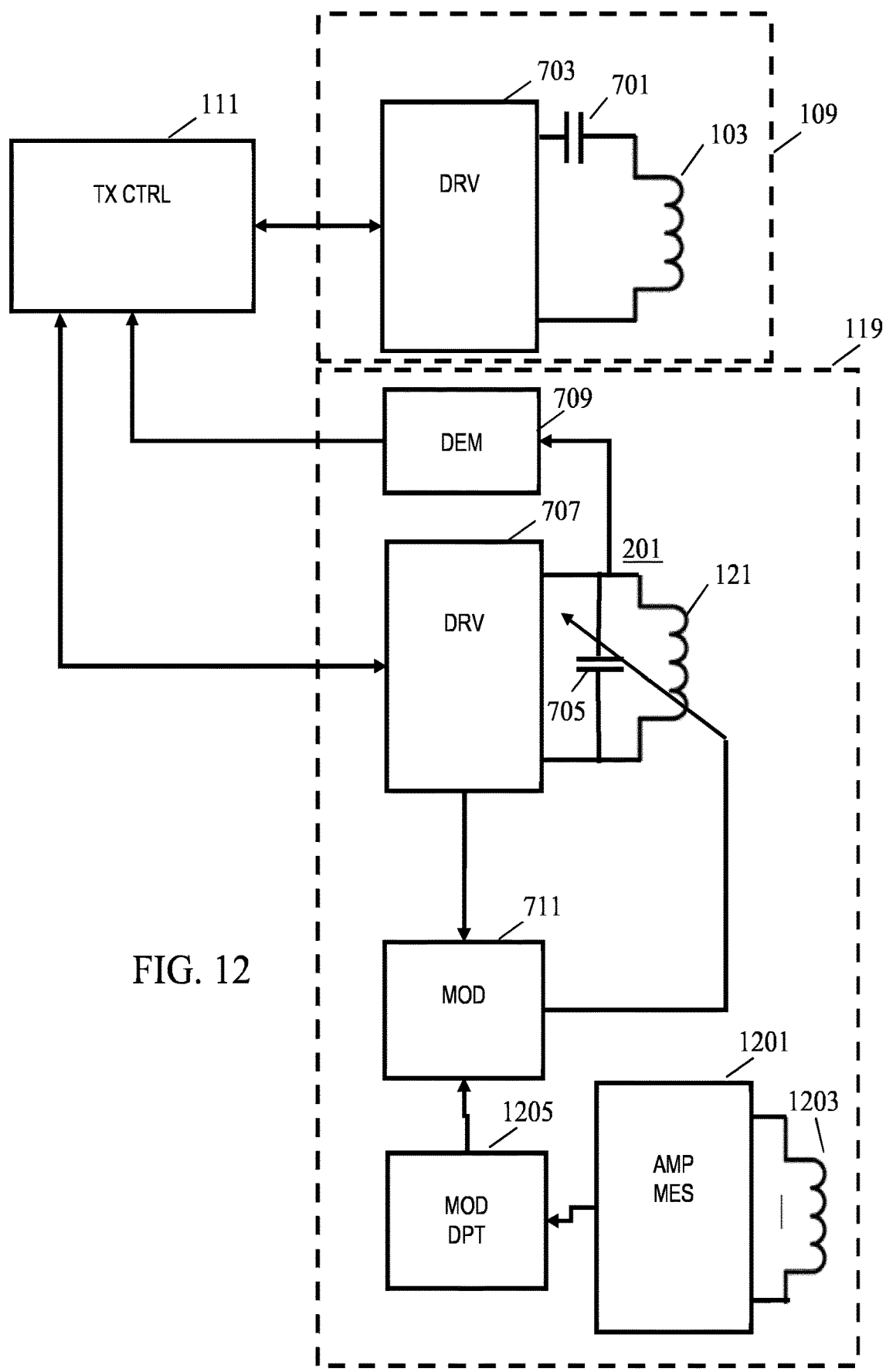
FIG. 12 illustrates an example of elements of a power transmitter in accordance with some embodiments of the invention.

In some embodiments, the power transmitter 101 may comprise functionality for controlling/adapting the modulation depth by adapting the resonance frequency. An example of such a power transmitter 101 is illustrated in FIG. 12 which corresponds to the power transmitter 101 of FIG. 7 but with additional circuitry for adapting the resonance frequency of the communication resonance circuit in response to an AM modulation depth.

In the example, the power transmitter communication circuit 119 further comprises an amplitude measurer 1201 which is arranged to measure amplitudes of the inductive communication signal. In the example of FIG. 12, the amplitude measurer 1201 is coupled to a measurement coil 1203 which is positioned in close proximity to the transmitter communication coil 121 and which is arranged to pick up the electromagnetic signal generated by this. Thus, a signal is induced in the measurement coil with the amplitude of this measurement signal increasing for increasing amplitude of the inductive communication signal.

It will be appreciated that in other embodiments, the amplitude measurements may e.g. correspond to direct measurements of a current and/or voltage of the communication resonance circuit.

The amplitude measurements may e.g. be generated periodically and may reflect the amplitude of the inductive communication signal for different amplitude value settings as given by the communication scheme used.

The amplitude measurer 1201 is coupled to a modulation depth determiner 1205 which is fed the amplitude measurements. In response, the modulation depth determiner 1205 determines a modulation depth measure. The modulation depth may reflect the degree or magnitude of amplitude variations resulting from the AM modulation. For example, for a scenario wherein the AM modulation uses only two different amplitude values, the modulation depth may be determined as a difference measure between the amplitude measurements corresponding to the two different values. For example, for a binary communication with each binary value being associated with a (different) amplitude, the modulation depth may be determined as the average amplitude for one binary data value minus the average amplitude for a second binary data value.

The modulation depth determiner 1205 is coupled to the modulator 711 and is arranged to feed the determined modulation depth to this. In response, the modulator 711 is arranged to adapt the variable resonance frequency of the communication resonance circuit.

For example, if the modulation depth is too high, the modulator 711 may be arranged to reduce the difference in the resonance frequencies corresponding to different amplitudes. However, if the modulation depth is too low, the modulator 711 may be arranged to increase the difference in the resonance frequencies corresponding to different amplitudes. In this way, the system may adapt the control of the resonance circuit 201 to provide a desired modulation depth. In particular, a modulation depth control loop may be implemented to provide a desired modulation depth.

The change in the resonance frequency may specifically be achieved by changing the timing, and typically specifically the frequency, of the drive signal(s) determining the duration of the fractional time intervals.

In some embodiments, the modulator 711 may be arranged to switch the variable resonance frequency between a set of (discrete) resonance frequencies in response to the data values. For example, only two amplitude values may be used for the AM modulation and the modulator 711 may be arranged to switch between two resonance frequencies depending on the data values. As mentioned, this may be achieved by changing the drive signal for the fractional time intervals between two different frequencies corresponding to the two resonance frequencies, Rather than these frequencies being predetermined, they may be dynamically adapted to provide a desired modulation depth.

For example, if only two amplitudes and thus two resonance frequencies are used, a first of the resonance frequencies may be selected as the inductive communication signal frequency, i.e. as 13.56 MHz in the specific example. However, the second frequency may not be predetermined but may dynamically be adapted to provide a desired modulation depth.

For example, if it is desired that the second amplitude is, say, 90% of the maximum amplitude (for the resonance frequency being the same as the frequency of the inductive communication signal), then a modulation depth determination indicting a lower modulation depth may result in the second resonance frequency being shifted to be further away from the first resonance frequency, and if the modulation depth determination indicates a higher modulation depth this may result in the second resonance frequency being shifted to be closer to the first resonance frequency.

Thus, in such approaches the adaptation of the resonance frequency of the communication resonance circuit may be adapted to provide a desired modulation depth. This may for example be used to ensure that the amplitude variation is sufficiently large to result in satisfactory communication performance while at the same time seeking to reduce the power level variation of the inductive communication signal.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. A power transmitter comprising:
a variable resonance circuit,
   wherein the variable resonance circuit is arranged to generate an inductive signal in response to a drive signal,
   wherein the variable resonance circuit comprises an inductive impedance and a capacitive impedance,
   wherein the variable resonance circuit has a variable resonance frequency,
   wherein the inductive impedance comprises a transmitter coil,
   wherein the transmitter coil is arranged to generate the inductive signal;
a driver, wherein the driver is arranged to generate the drive signal for the variable resonance circuit; and
a modulator, wherein the modulator is arranged to amplitude modulate the inductive signal for transmitting data values to a power receiver by varying the variable resonance frequency in response to the data values;
wherein the variable resonance circuit comprises a resonance modification circuit,
wherein the resonance modification circuit is arranged to control the variable resonance frequency by slowing a state change for at least one of the capacitive impedance and the inductive impedance for a fractional time interval of at least a portion of at least one cycle(s) of the drive signal, wherein the modulator is arranged to adapt the duration of the fractional time interval in response to the data values, wherein the resonance modification circuit is arranged to determine one of a start time and an end time of the fractional time interval in response to a signal of the resonance circuit, wherein the modulator is arranged to control the other of the start time and the end time in response to the data values.

2. The power transmitter of claim 1, further comprising:
an amplitude measurer, wherein the amplitude measurer is arranged to measure amplitudes of the inductive signal;
a modulation depth determiner, wherein the modulation depth determiner is arranged to determine a modulation depth in response to variations in the measured amplitudes,
wherein the modulator is arranged to vary the variable resonance frequency in response to the modulation depth.

3. The power transmitter of claim 2,
wherein the modulator is arranged to switch the variable resonance frequency between a set of resonance frequencies in response to the data values, and
wherein the modulator is arranged to determine at least one frequency of the set of resonance frequencies in response to the modulation depth.

4. The power transmitter of claim 1, further comprising a demodulator, wherein the demodulator is arranged to demodulate load modulation of the inductive signal.

5. The power transmitter of claim 1, further comprising:
a power transfer transmitter coil,
wherein the power transfer transmitter coil is arranged to generate an inductive power transfer signal,
wherein the power transfer transmitter coil is arranged to provide power to the power receiver,
wherein a maximum power of the inductive power transfer signal is higher than a maximum power of the inductive signal; and
a power transfer controller, wherein the power transfer controller is arranged to initialize a power transfer to the power receiver via the inductive power transfer signal,
wherein the power transfer controller is arranged to generate at least a portion of the of the data values as a power transfer initialization control data.

6. The power transmitter of claim 1, wherein drive signal has a drive frequency which is independent of the data values.

7. The power transmitter of claim 1, wherein at least one of a voltage amplitude and a current amplitude of the drive signal is independent of the data values.

8. The power transmitter of claim 1, wherein a frequency of the drive signal is greater or equal to 10 MHz.

9. A wireless power transfer system comprising:
a power transmitter and a power receiver, the power transmitter comprising:
a variable resonance circuit,
wherein the variable resonance circuit is arranged to generate an inductive signal in response to a drive signal,
wherein the variable resonance circuit comprises an inductive impedance and a capacitive impedance,
wherein the resonance circuit has a variable resonance frequency,
wherein the inductive impedance comprises a transmitter coil,
wherein the transmitter coil is arranged to generate the inductive signal;
a driver, wherein the driver is arranged to generate the drive signal for the variable resonance circuit;
a modulator, wherein the modulator is arranged to amplitude modulate the inductive signal for transmitting data values to a power receiver by varying the variable resonance frequency in response to the data values;
a power transfer transmitter coil, wherein the power transfer transmitter coil is arranged to generate an inductive power transfer signal,
wherein the power transfer transmitter coil is arranged to provide for providing power to the power receiver,
wherein a maximum power of the inductive power transfer signal is higher than a maximum power of the inductive signal; and
a power transfer controller, wherein the power transfer controller is arranged to initialize a power transfer to the power receiver via the inductive power transfer signal,
wherein the power transfer controller is arranged to generate at least a portion of the of the data values as a power transfer initialization control data;
the power receiver comprising:
a receiver coil, wherein the receiver coil is arranged to receive the inductive signal;
a demodulator, wherein the demodulator is arranged to demodulate amplitude modulation of the inductive signal; and
a first power extractor, wherein the first power extractor is arranged to extract power from the inductive signal and for powering at least part of the power receiver;
wherein the variable resonance circuit comprises a resonance modification circuit,
wherein the resonance modification circuit is arranged to control the variable resonance frequency by slowing a state change for at least one of the capacitive impedance and the inductive impedance for a fractional time interval of at least a portion of at least one cycle(s) of the drive signal,
wherein the modulator is arranged to adapt the duration of the fractional time interval in response to the data values;
a power transfer receiver coil, wherein the power transfer receiver coil is arranged to receive the inductive power transfer signal; and
a second power extractor, wherein the second power extractor is arranged to extract power from the inductive power transfer signal and for powering a load.

10. The wireless power transfer system of claim 9,
wherein the first power extractor is arranged to power the at least part of the power receiver when the inductive power transfer signal is not present,
wherein the second power extractor is arranged to power the at least part of the power receiver when the inductive power transfer signal is present.

11. A power transmitter comprising:
a variable resonance circuit,
wherein the variable resonance circuit is arranged to generate an inductive signal in response to a drive signal,
wherein the variable resonance circuit comprises an inductive impedance and a capacitive impedance, wherein the variable resonance circuit has a variable resonance frequency,
wherein the inductive impedance comprises a transmitter coil,
wherein the transmitter coil is arranged to generate the inductive signal;
a driver, wherein the driver is arranged to generate the drive signal for the variable resonance circuit; and
a modulator, wherein the modulator is arranged to amplitude modulate the inductive signal for transmitting data values to a power receiver by varying the variable resonance frequency in response to the data values;
wherein the variable resonance circuit comprises a resonance modification circuit,
wherein the resonance modification circuit is arranged to control the variable resonance frequency by slowing a state change for at least one of the capacitive impedance and the inductive impedance for a fractional time interval of at least a portion of at least one cycle(s) of the drive signal,
wherein the modulator is arranged to adapt the duration of the fractional time interval in response to the data values,
an amplitude measurer, wherein the amplitude measurer is arranged to measure amplitudes of the inductive signal;
a modulation depth determiner, wherein the modulation depth determiner is arranged to determine a modulation depth in response to variations in the measured amplitudes,
wherein the modulator is arranged to vary the variable resonance frequency in response to the modulation depth.

\* \* \* \* \*